(12) United States Patent
Oh et al.

(10) Patent No.: US 6,959,297 B2
(45) Date of Patent: Oct. 25, 2005

(54) SYSTEM AND PROCESS FOR SEARCHING WITHIN A DATA STREAM USING A POINTER MATRIX AND A TRAP MATRIX

(75) Inventors: Jintae Oh, St. Louis, MO (US); Ilsup Kim, St. Louis, MO (US); Hojae Lee, St. Louis, MO (US)

(73) Assignee: Winnow Technology, LLC, St. Louis, MO (US)

( * ) Notice: Subject to any disclaimer, the term of this patent is extended or adjusted under 35 U.S.C. 154(b) by 420 days.

(21) Appl. No.: 10/132,336

(22) Filed: Apr. 25, 2002

(65) Prior Publication Data

US 2003/0208487 A1 Nov. 6, 2003

(51) Int. Cl.⁷ .......................... G06F 17/00; G06F 17/30
(52) U.S. Cl. ........................................ 707/6; 707/101
(58) Field of Search .................... 707/6, 101; 382/229; 708/203, 212; 370/537

(56) References Cited

U.S. PATENT DOCUMENTS

| | | | |
|---|---|---|---|
| 5,369,605 A | 11/1994 | Parks ..................... | 364/715.09 |
| 5,469,161 A | 11/1995 | Bezek ......................... | 341/51 |
| 5,497,488 A | 3/1996 | Akizawa et al. ............ | 395/600 |
| 5,511,213 A | 4/1996 | Correa ....................... | 395/800 |
| 5,525,982 A | 6/1996 | Cheng et al. ................. | 341/51 |
| 5,532,693 A | 7/1996 | Winters et al. ............... | 341/51 |
| 5,576,985 A | 11/1996 | Holtz ........................... | 365/49 |
| 5,602,764 A | 2/1997 | Eskandari-Gharnin et al. ..................... | 364/715.09 |
| 5,631,971 A | 5/1997 | Sparrow ..................... | 382/125 |
| 5,680,612 A | 10/1997 | Asada et al. ............... | 395/613 |
| 5,777,608 A | 7/1998 | Lipovski et al. ............ | 345/189 |
| 5,805,801 A | 9/1998 | Holloway et al. ....... | 395/187.01 |
| 5,809,145 A | 9/1998 | Slik et al. ..................... | 380/25 |
| 5,829,051 A | 10/1998 | Steely, Jr. et al. .......... | 711/216 |
| 5,845,298 A | 12/1998 | O'Conner et al. .......... | 707/206 |
| 5,856,977 A | 1/1999 | Yang et al. .................. | 370/411 |
| 5,867,609 A | 2/1999 | Shamoon et al. ........... | 382/278 |
| 5,907,838 A | 5/1999 | Miyasaka et al. .............. | 707/4 |
| 5,913,216 A | 6/1999 | Kneuer et al. .............. | 707/101 |
| 5,940,389 A | 8/1999 | Yang et al. .................. | 370/380 |
| 5,987,028 A | 11/1999 | Yang et al. .................. | 370/380 |
| 6,070,162 A | 5/2000 | Miyasaka et al. .............. | 707/4 |
| 6,098,089 A | 8/2000 | O'Connor et al. .......... | 709/104 |
| 6,119,120 A | 9/2000 | Miller ........................ | 707/101 |
| 6,147,890 A | 11/2000 | Kawana et al. ............... | 365/49 |

(Continued)

FOREIGN PATENT DOCUMENTS

EP 0859333 8/1998 ............ G06K/9/00

OTHER PUBLICATIONS

Cohen, "Recursive hashing functions for n–grams", ACM 1997, pp. 291–320.*

Brenner, "Extending APL for pattern matching", ACM 1983, pp. 275–280.*

(Continued)

*Primary Examiner*—Uyen Le
(74) *Attorney, Agent, or Firm*—Thompson Coburn LLP

(57) ABSTRACT

A trap matrix searches the entire contents of a data stream for a pattern that matches the pattern for a search term. In those circumstances where there is a match between patterns of the data stream and the search term, the method and system can proceed to an exact match operation. In particular, a pointer matrix and a corresponding active control matrix are generated according to a set of terms in a rule table. Data is sequenced through the trap matrix according to the hierarchy of its trap elements. The trap elements perform a pattern match check between the sequenced data stream and any search term in the set of terms in the rule table. Results from a positive pattern match are preferably communicated from the matching trap element to an exact match lookup.

39 Claims, 14 Drawing Sheets

U.S. PATENT DOCUMENTS

| | | | |
|---|---|---|---|
| 6,151,598 | A | 11/2000 | Shaw et al. ................... 707/3 |
| 6,167,393 | A | 12/2000 | Davis, III et al. .............. 707/3 |
| 6,223,172 | B1 | 4/2001 | Hunter et al. .................. 707/3 |
| 6,240,407 | B1 | 5/2001 | Change et al. ................. 707/2 |
| 6,253,243 | B1 | 6/2001 | Spencer ..................... 709/224 |
| 6,263,313 | B1 | 7/2001 | Milsted et al. ................ 705/1 |
| 6,314,506 | B1 | 11/2001 | Stanton et al. .............. 711/220 |
| 6,338,056 | B1 | 1/2002 | Dessloch et al. .............. 707/2 |
| 6,345,256 | B1 | 2/2002 | Milsted et al. ................ 705/1 |
| 2002/0019629 | A1 | 2/2002 | Navoni et al. |
| 2002/0034329 | A1 | 3/2002 | Navoni et al. |

OTHER PUBLICATIONS

Cohen, "An N-Gram Hash and Skip Algorithm for Finding Large Numbers of Keywords in Continuous Text Streams," Software—Practice and Experience, 1998, pp. 1605–1635, vol. 28.

Cohen, "Hardware-Assisted Algorithm for Full-Text Large-Dictionary String Matching Using N-Gram Hashing," Information Processing & Management, 1998, pp. 443–464, vol. 34.

* cited by examiner

SYSTEM AND PROCESS FOR SEARCHING WITHIN A DATA STREAM USING A POINTER MATRIX AND A TRAP MATRIX

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates generally to content searching engines and, more particularly, to a content searching engine using trap matrix elements.

2. Description of Related Art

It is currently known for content searching engines to use binary search methods to find a particular term in a stream of data. In using such search methods, it is further known for the stream of data to be read out from memory, such information stored in a database or other memory device, or for the stream of data to be communicated through computer networks, such as from the internet (the internet itself may even be considered to be a form of a decentralized database system). Regardless of the stream of data being searched, systems that use such binary search engines must search all potential combinations in the data stream for the search term. For example, to search a data stream for a ten-character term (such as "get passwd"), a binary search engine would have to search over $1.2*10^{24}$ combinations ($256^{10}$ combinations). The entire data stream cannot be efficiently searched using such a method. Either many processors would need to work in parallel to compute all of the operations necessary for the binary searching engine, or the searches are performed statically, capturing and searching only a segment of the data stream and letting other segments pass without searching the exact contents.

BRIEF SUMMARY OF THE INVENTION

It is in view of the above problems that the present invention was developed. The invention is a method and system for using a trap matrix to search the entire contents of a data stream for a pattern that watches the pattern for a search term. In those circumstances where there is a match between patterns of the data stream and the search term, the method and system can proceed to an exact match operation. In particular, the present invention generates a pointer matrix and a corresponding active control matrix according to a set of terms in a rule table. Data is sequenced through the trap matrix according to the hierarchy of its trap elements. The trap elements perform a pattern match check, and also preferably perform a character match check, between the sequenced data stream and any search term in the set of terms in the rule table. Results from a positive pattern match, and any corresponding positive character match, are preferably communicated from the matching trap element to an exact watch lookup.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE INVENTION

Figure 1:
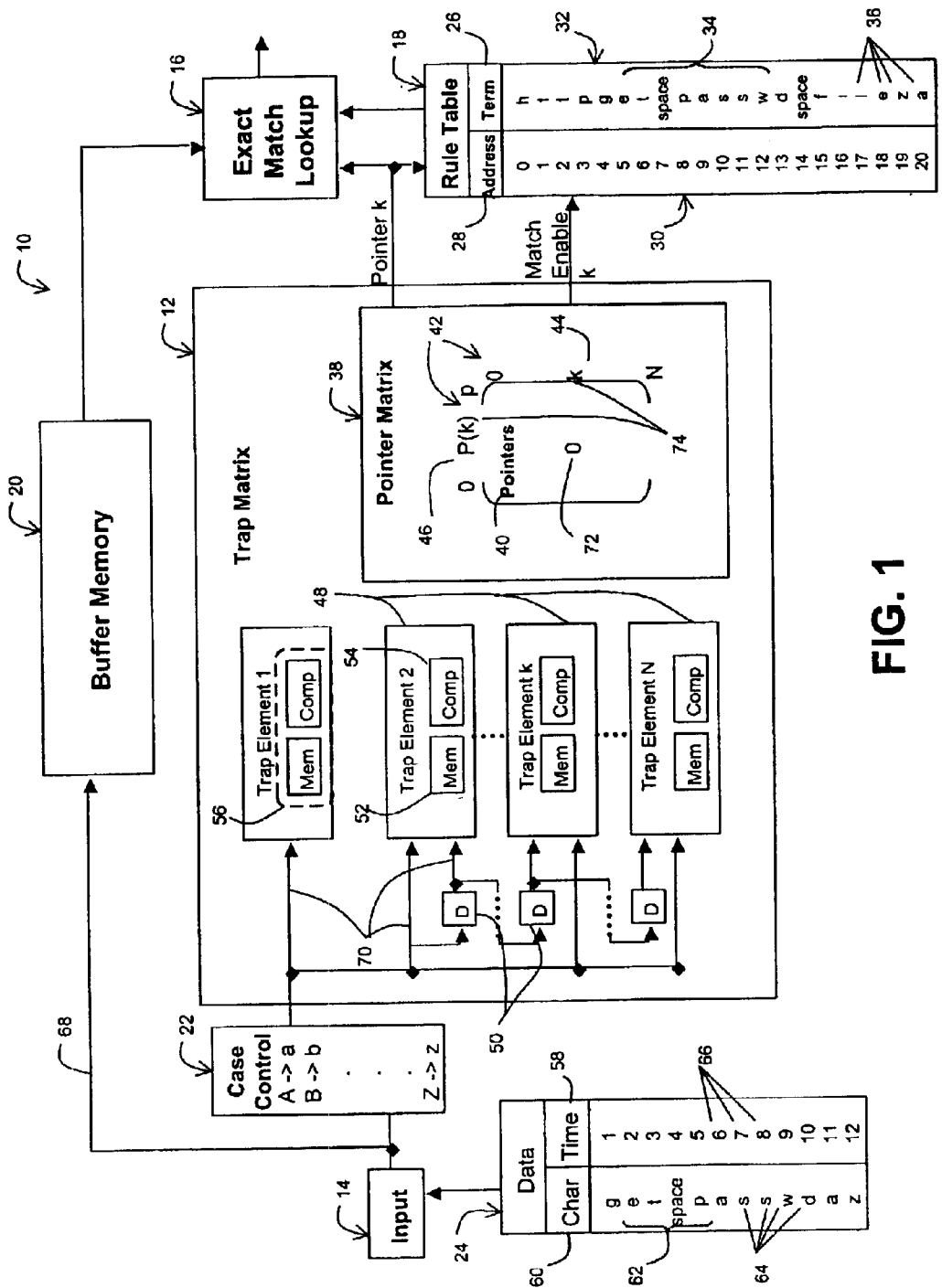
FIG. 1 illustrates a schematic diagram view of a content searching engine according to the present invention.

Referring to the accompanying drawings in which like reference numbers indicate like elements, FIG. 1 illustrates a diagrammatic view of a content searching engine 10 according to the present invention. Generally, the content searching engine 10 has a trap matrix 12 in communication with an input device 14, an exact match lookup 16 and a rule table 18. The content searching engine 10 also includes a buffer memory 20 between the input device 14 and the exact match lookup 16 and may also include an optional case control module 22 between the input device 14 and the trap matrix 12. As discussed below, the system of the content searching engine 10 operates on a data stream 24 that is communicated through the input device 14.

The rule table 18 includes a set of terms 26 and a set of table addresses 28. Each of the terms in the set of terms 26 is stored in the rule table 18 at a location 30 defined by the set of table addresses 28. For example, the term "get passwd file" and any corresponding prefix, such as "http" that may be used for a protocol, is stored at a location defined by table addresses 0–18. Each successive term, along with any corresponding prefix, can immediately follow the preceding term at the next location, with the next location being defined by the next table address. According to the particular example and with reference to the table below, the term following "get passwd file" could begin immediately after the last character in the preceding term, at address 19. Although the preferred embodiment of the rule table 18 is illustrated with multiple terms, it should be recognized that the set of terms 26 may include as few as a single term.

It will also be recognized that the terms 26 have a number of characters 32 in a number of lengths 34 and combinations 36. For example, as illustrated in Table 1 below, a term following "get passwd file" could be "get pwl file type" and may also have a prefix. According to this particular example, the first several characters ("get p") of both terms are identical, but the subsequent characters are different and represent a different character combination. Additionally, the lengths of the terms are different; the length of the term "get passwd file" is fifteen (15) characters, whereas the length of the term "get pwl file type" is seventeen (17) characters. In the case where the rule table 18 has a single term, such term would have an individual character length and an individual character combination.

equal character lengths, the set of patterns uniquely corresponds with the character combinations for those each one of the terms 26 having the particular character length. Given that the set of terms 26 may have a single term, the row and column coordinates 42 for such a term would be the length of the term's characters and the pattern resulting from the term's characters.

The trap matrix 12 includes a set of trap elements 48 and a corresponding set of delay elements 50. Each of the trap

TABLE 1

EXAMPLE OF RULE TABLE

| ADDRESS | ... | 70 | 71 | 72 | 73 | 74 | 75 | 76 | 77 | 78 | 79 | 80 | 81 | 82 | 83 | 84 | 85 | 86 | ... |
|---|---|---|---|---|---|---|---|---|---|---|---|---|---|---|---|---|---|---|---|
| TERM | ... | g | e | t | | p | w | l | | f | i | l | e | | t | y | p | e | ... |

The content searching engine 10 also includes a pointer matrix 38 that is defined by the terms 26 and addresses 28 in the rule table 18. The pointer matrix 38 includes a set of one-to-one pointers 40 that are particularly defined by table addresses 28 for each one of the terms 26 in the rule table 18. The pointer matrix 38 has row and column coordinates 42 that are defined according to character lengths 44 and character combinations 46. The character lengths 44 and character combinations 46 correspond with the set of terms 26 according to the lengths of the characters 34 and the combinations of the characters 36, respectively. Therefore, for each one of the terms 26 in the rule table 18, the pointer matrix 38 stores the corresponding table addresses 28 at the row and column coordinates 42 according to the lengths 32 and combinations 34 of the characters in each one of the particular terms 26. For example, the address identifying the term "get pwl file type" ("70" in Table 1 above) would be stored as the term's corresponding one-to-one pointer 40 in the pointer matrix 38. The particular address ("70") is stored in and can be read out from the pointer matrix 38 according to the rows and columns 42 that also correspond with the length of the characters in each of the terms 26 and the combination of the characters in each of the terms 26. In this manner, the set of one-to-one pointers 40 correlate the table addresses 28 for each one of the terms 26 in the rule table 18.

According to the present invention, the character combinations 46 used for storing the pointers 40 in the pointer matrix 38 are generally defined by a set of patterns that uniquely correspond with the set of terms 26 according to the characters within each one of the terms 26. As discussed in detail below, there are many types of patterns that can be defined using the character combinations 46. In the preferred embodiment of the present invention, the set of patterns is a set of compressed character values that is produced by compressing the characters in each one of the terms 26 according to a numerical operation and a truncation operation. It will be appreciated that terms 26 with different character lengths may have the same compressed character value because at least one of the row and column coordinates 42 for two terms is different due to the different character lengths. As a corollary, it will be appreciated that when a pair of terms 26 with the same character length also have the same compressed value, the compressed value for one of the terms 26 may be calculated based on a fewer number of characters and the pointer address would be stored according to the shortened character length to ensure that the set of pointers 40 has a one-to-one correspondence with each one of the terms 26. Accordingly, for those terms 26 that have elements 48 has a memory 52 in communication with a corresponding comparator 54 and are generally referred to as memory-comparator pairs 56 for each of the trap elements 48. The trap elements 48 are in multiplexed communication with the input device 14 and have a hierarchy (1 to N) according to the set of delay elements 50. The hierarchy of the trap elements 48, particularly including the memory-comparator pairs 56, is preferably in a one-to-one correspondence with the character lengths 34 of the set of terms 26. In particular, the trap matrix 12 has an increasing series of delay elements 50 between each of the trap elements 48 and the input device 14. The increasing series of delay elements 50 define an increasing order in the hierarchy of the trap elements 48, and the increasing order of hierarchy corresponds with an increasing character length of the data stream 24. Therefore, with each increasing order, the trap elements are able to examine the character patterns of increasing lengths of the data stream 24.

In operation, the input device 14 receives the data stream 24 during a time period 58 as illustrated in Table 2 below. The data stream 24 includes a set of data characters 60 having a length 62 and a combination 64, and the time period 58 is made up of clock cycles 66. 'The input device 14 also communicates the data stream 24 to the buffer memory 20 through a bypass 68. The trap matrix 12 receives the data stream 24 from the input device 14 and sequences the set of characters 60 in the data stream 24 through each of the trap elements 48. The sequenced set of data characters enter the memory-comparator pairs 56 as a set of sequenced data 70 according to the hierarchy of the trap elements 48.

As the trap matrix 12 sequences the data stream 24 through the trap elements 48, the memory-comparator pairs 56 perform a pattern match check between patterns (P) of the sequenced data 70 and the set of patterns defined by the combination of characters 36 for each one of the terms 26 in the rule table 18. Each of the memory-comparator pairs 56 simultaneously performs the pattern match check according to the one-to-one correspondence between the hierarchy of the trap elements 48 and the character lengths 34 of the set of terms 26. A positive pattern match by one of the matching memory-comparator pairs particularly defines a particular one-to-one pointer 72 that contains one of the addresses 28 of one of the terms 26 in the rule table 18. The particular one-to-one pointer 72 has a row and column coordinate 74 according to the hierarchy of the matching trap element (k) and the pattern (P) of the sequenced data 70 in the matching trap element (P[k]).

The exact match lookup 16 communicates with the buffer memory 20, trap matrix 12 and the rule table 18. The exact match lookup 16 receives the particular one-to-one pointer 72 from the pointer matrix 38. The exact match lookup 16 retrieves one of the terms 26 from the rule table 18 according to the table address corresponding with the one-to-one pointer 72 from the pointer matrix 38. The exact match lookup 16 examines the retrieved term with the portion of the data stream 24 from the buffer memory 20 that corresponds with the time period according to the matching memory-comparator pair. With the exact term retrieved from the rule table 18 and the corresponding portion of the data stream 24 from the buffer memory 20, the exact match lookup checks for an exact match therebetween.

Figure 2:
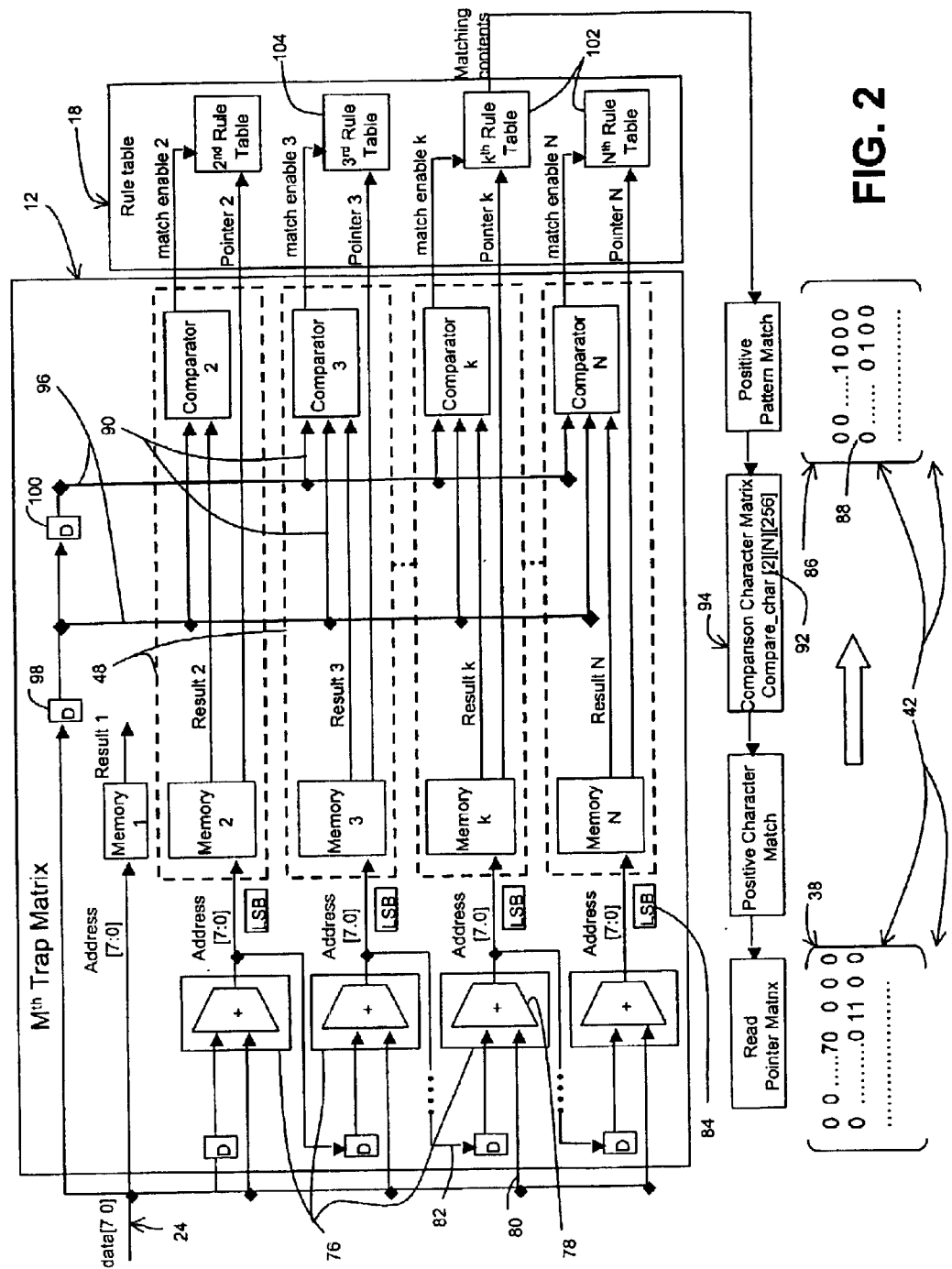
FIG. 2 illustrates a schematic diagram view of a preferred embodiment of the trap matrix according to the preferred embodiment of the present invention.

The preferred embodiment of the trap matrix 12 and rule table 18 is now particularly described with reference to FIG. 2. As discussed above, the pattern for each of the terms 26 in the rule table 18 can be defined according to a set of compressed character values. Generally, each one of the terms 26 can be compressed by expressing each character in a term according to a defined value and performing a set of operations on the set of values. For example, the operation may be a numerical and/or logical operation, such as summation, subtraction, multiplication, division, XOR, XNOR, and concatenation. The set of operations may be a single numerical operation, such as summation, performed on each character in each of the terms 26. It is also possible that the set of operations may be multiple operations. According to the preferred embodiment of the present invention, the summation operation exemplifies the compression of the terms 26. For example, as summarized in Table 2 below, the hexadecimal (0x) representation of the characters in the term "get passwd" can be summed into a compressed character value of 0x3E2.

It should be recognized that this preferred method of compression is a one-way compression according to Equation 1 below because there is not a one-to-one correspondence between the compressed character value and the term being compressed. As the number of characters in the term increase, the number of other combinations of characters that would also have the same compressed character value increases exponentially. Therefore, once the term is compressed according to the sum of the character values (or any other operation on the character values), the compressed character value cannot be expanded back into the term as a one-to-one representation. Instead of being a one-to-one representation of the term, the compressed character value is a probability of the term. For example, the compressed character value for the 10-character term "get passwd" is 0x3E2 (i.e., Σ"get passwd"⇒0x3E2), and the compressed character value for the 10-character term "got pissed" is also 0x3E2 (i.e., Σ"got pissed"⇒0x3E2). Therefore, it is evident that, by itself, 0x3E2 is not a one-to-one representation of "get passwd".

$$\Sigma(0x\ Term), @0x\ Character\ in\ Term \Rightarrow Compressed\ Character\ Value\ for\ Term \qquad (1)$$

The compressed character value may be further compressed by removing the most significant bits (MSB) and thereby truncating the summation total to its least significant bits (LSB) according to Equation 2 below. For example, the most significant hexadecimal bit of 0x3 in the summation total of 0x3E2 can be removed, thereby truncating the summation total and resulting in a truncated compressed character value of 0xE2. Therefore, the term "get passwd" can be compressed and checked with the sequenced data stream 70 based on its character length of 10 and its pattern value of 0xE2. As discussed above, a table address for the term "get passwd" would be stored as the one-to-one pointer in the pointer matrix 38 and would be stored at the row and column coordinate corresponding to the character length of 10 and pattern value of 0xE2. It will be further appreciated that the set of one-to-one pointers 40 may correspond with the first or last character in each of the terms 26 in the rule table 18 and all of the characters in the term can be read out from the rule table 18 based on the address of the first character and the character length of the term.

$$\text{Truncated Compressed Character Value} = \text{LSB}(\text{Compressed Character Value}) \qquad (2)$$

As discussed above, the trap matrix 12 sequences the data stream 24 through the trap elements 48, and the memory-comparator pairs 56 perform the pattern match check between patterns (P) of the sequenced data 70 and the set of patterns defined by each one of the terms 26 in the rule table 18. Accordingly, the trap matrix 12 performs the same set of operations on the data stream 24 that is performed on the terms 26 in the rule table 18. This allows for each one of the trap elements 48 to simultaneously perform the pattern match check between the sequenced data 70 and each one of the terms 26 according to each of the hierarchies in the trap matrix 12.

TABLE 2

EXAMPLE OF COMPRESSED CHARACTER VALUE

| HEX Value(0x) | 67 | 65 | 74 | 20 | 70 | 61 | 73 | 73 | 77 | 64 | Compressed Character Value |
|---|---|---|---|---|---|---|---|---|---|---|---|
| Term Character | g | e | t |   | p | a | s | s | w | d | = 0x3E2 (Summation Total) |
| Table Address | 11 | 12 | 13 | 14 | 15 | 16 | 17 | 18 | 19 | 20 | Term Length = 10 |

Accordingly, for the preferred embodiment, the trap matrix 12 includes a set of compression operators 76 located between the input and each one of the memory-comparator pairs 56. In the preferred embodiment the summation operation 78 is performed in the set of operations, adding each current character 80 with a set of prior summed characters 82 according to the hierarchy of the trap elements 48, based on the series of delays 50 through which the data 24 is sequenced.

Additionally, the sequenced data 70 from each summation 78 is preferably truncated in an LSB operation 84. The one-to-one pointers 40 in the pointer matrix 38 can then be examined based on the pattern of the summed and truncated sequenced data 70 as it is communicated from the input device 14 to each of the trap elements 48 as discussed above. In particular, each one of the comparators 54 can query the pointer matrix 38 at the row and column coordinate corresponding with the hierarchy of the trap elements 48 and with the pattern of the summed and truncated sequenced data 70 in each one of the corresponding memories 52. When the pointer matrix 38 contains a pointer 72 at the row and column coordinate, the corresponding comparator 54 identifies the positive pattern match and the content searching engine 10 can proceed to the exact match lookup 16. It will be recognized that the first table address in the rule table 18 may be a zero value and that the first table address does not need to be used for the first character of any of the term 26. Additionally, it will be recognized that the one-to-one pointers 40 can be set up to identify the last character in the term (which are all be non-zero, even when the first term begins as the first table address in the rule table 18).

It will be appreciated that the memories 52 in each one of the trap elements 48 can be the size for the sequenced data 70, regardless of hierarchy, due to the compression and truncation of the characters in the data stream 24. In particular, for the preferred embodiment, the compressed and truncated sequenced data 70 can be stored in a single byte ([7:0]), which is between 0 and FF in hexadecimal format and between 0 and 255 in decimal format (between 00000000 and 11111111 in binary format). It will also be appreciated that the memories 52 may be larger, such as being sized to accommodate at least one additional bit for case control and additional size for a prefix, such as a header in a data packet.

As discussed above, a direct examination of the pointer matrix 38 can be used to perform the pattern match check between the sequenced data 70 in any one of the trap elements 48 and the terms 26 in the rule table 18. Additionally, according to the preferred embodiment of the present invention, an active control matrix 86 may be used to perform the pattern match check between the sequenced data 70 and the terms 26. The active control matrix 86 is very similar to the pointer matrix 38. The active control matrix 86 uses the same row and column coordinates 42 as the pointer matrix 38, including the definitions for the row and column coordinates 42 (i.e., identical row and column coordinate system defined according to the character lengths 44 and the character combinations 46). The difference between the active control matrix 86 and the pointer matrix 38 is in their contents. As discussed above, the pointer matrix 38 contains the set of addresses 28 for the terms 26 in the rule table 18. In comparison, the active control matrix 86 contains a set of flags 88, such as a set of binary numbers having one and zero bits. Therefore, the set of flags 88 in the active control matrix 86 correspond with the addresses in the pointer matrix 38 according to Equation 3 below. In general, the set of flags 88 identify whether there is a pointer 72 in the pointer matrix 38 at each corresponding row and column coordinate 42. Therefore, according to the preferred embodiment, the pattern match is first identified by one of the flags 88 in the active control matrix 86, and the pointer 72 for the term with the corresponding pattern and length may then be read from the same row and column coordinate 42 in the pointer matrix 38 as the matching flag in the active control matrix 86.

[Table Address in Pointer Matrix]⇒[Flag in Active Control Matrix]  (3)

In the preferred embodiment, any one of the trap elements 48 that identifies a positive pattern match then performs a character match check prior to proceeding to the exact match lookup 16. In the character match check, a pair of data characters 90 from the data stream 24 are compared with two uncompressed term characters 92 from a comparison character matrix 94. The uncompressed term characters 92 in the comparison character matrix 94 are character segments from each one of the terms 26 in the rule table 18 and are stored in the comparison character matrix 94 according to the length of the terms 34.

It will be appreciated that the uncompressed term characters may be taken from any corresponding location in each of the terms 26, and the trap matrix 12 can be designed accordingly. For example, in the preferred embodiment, the uncompressed term characters are the last two characters in each one of the terms 26, and the trap matrix is designed such that the pair of data characters 90 are the last two characters from the data stream 24 that entered the trap elements 48. In particular, the pair of data characters 90 are in a multiplexed communication through a pair of communication paths 96. The pair of data characters 90 are not routed through a compression operator and are instead communicated through a delay element 98 before the communication paths 96 and through a delay element 100 between the communication paths 96.

It will also be appreciated that other combinations of characters are possible by altering the series of delays 98, 100. For example, the last character and third to last character can be the characters to be compared in the character match check by using a delay of two clock cycles 66, i.e., a pair of delay elements, for the delay element 100 between the communication paths 96. It will be further appreciated that a single character can also be used for the character match check and more than two characters may also be used for the character match check.

Based on the general description of the content searching engine 10 and the particular description of the rule table 18 above, it will be appreciated that the terms 26 in the rule table 18 can be sorted and stored based on their lengths 32. The rule table 18 can be virtually segmented into a set of N rule tables 102, with all rules of a single length being stored in each one of the rule tables 104 in the set of rule tables 102.

Figure 3:
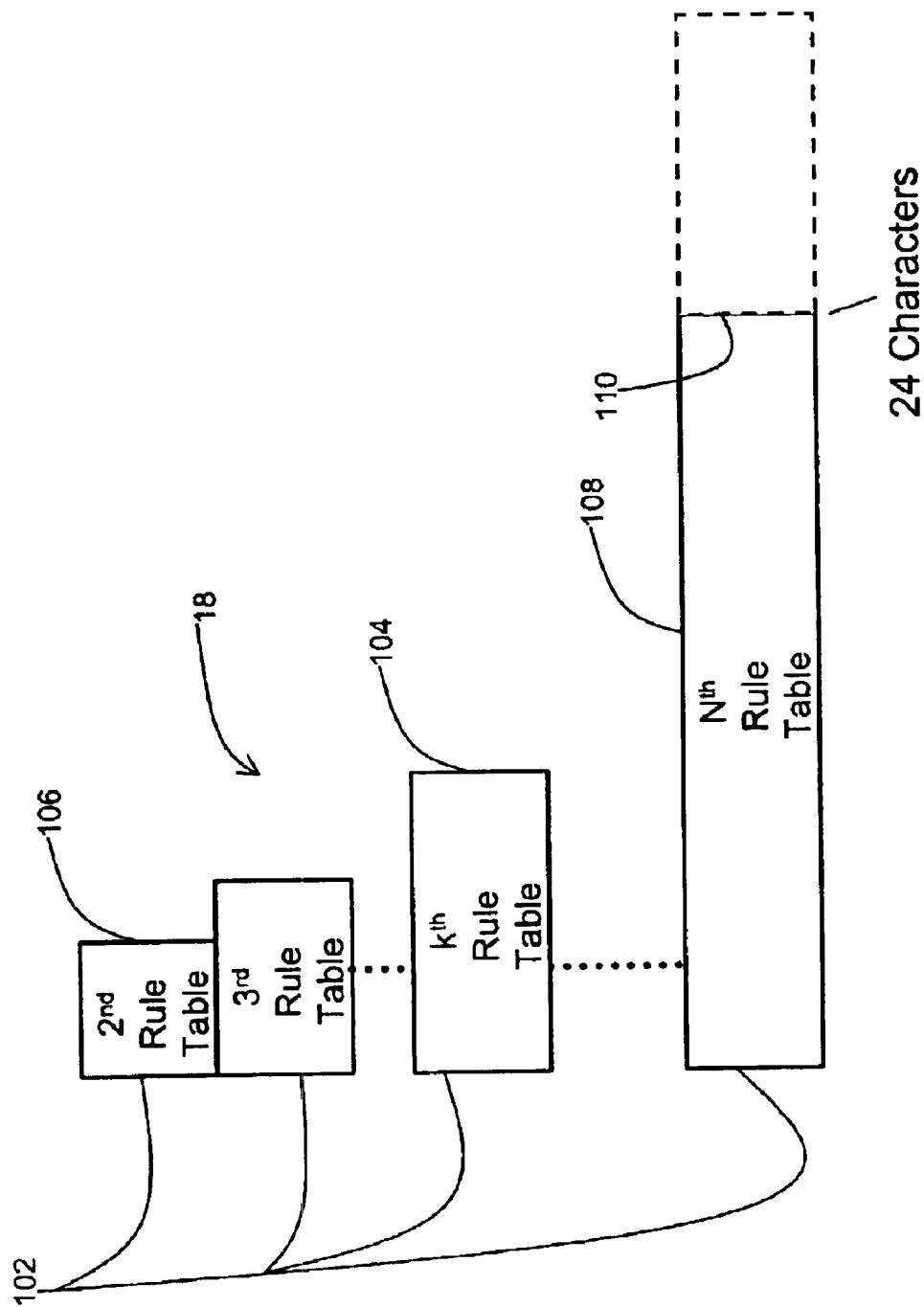
FIG. 3 illustrates a detailed view of a rule table used in the present invention.

As particularly illustrated in FIG. 3, the lengths of the rules in the set of rule tables 102 may preferably range from a two-character length in the $2^{nd}$ rule table 106 to an N-character length in the $N^{th}$ rule table 108 and have a one-to-one correspondence with the number of trap elements 48. The $N^{th}$ rule table preferably contains terms having a 24-character length 110. It will be appreciated that there may be terms in the rule table 18 with lengths significantly greater than twenty-four (24) characters and that it is possible to use pattern matching with these longer terms based on patterns generated using the 24-character length. For example, when the content searching engine 10 is incorporated into an intrusion detection system, the terms 26 would be based on intrusion detection rules, some of which are known to be greater than 150-characters in length.

Figure 4:
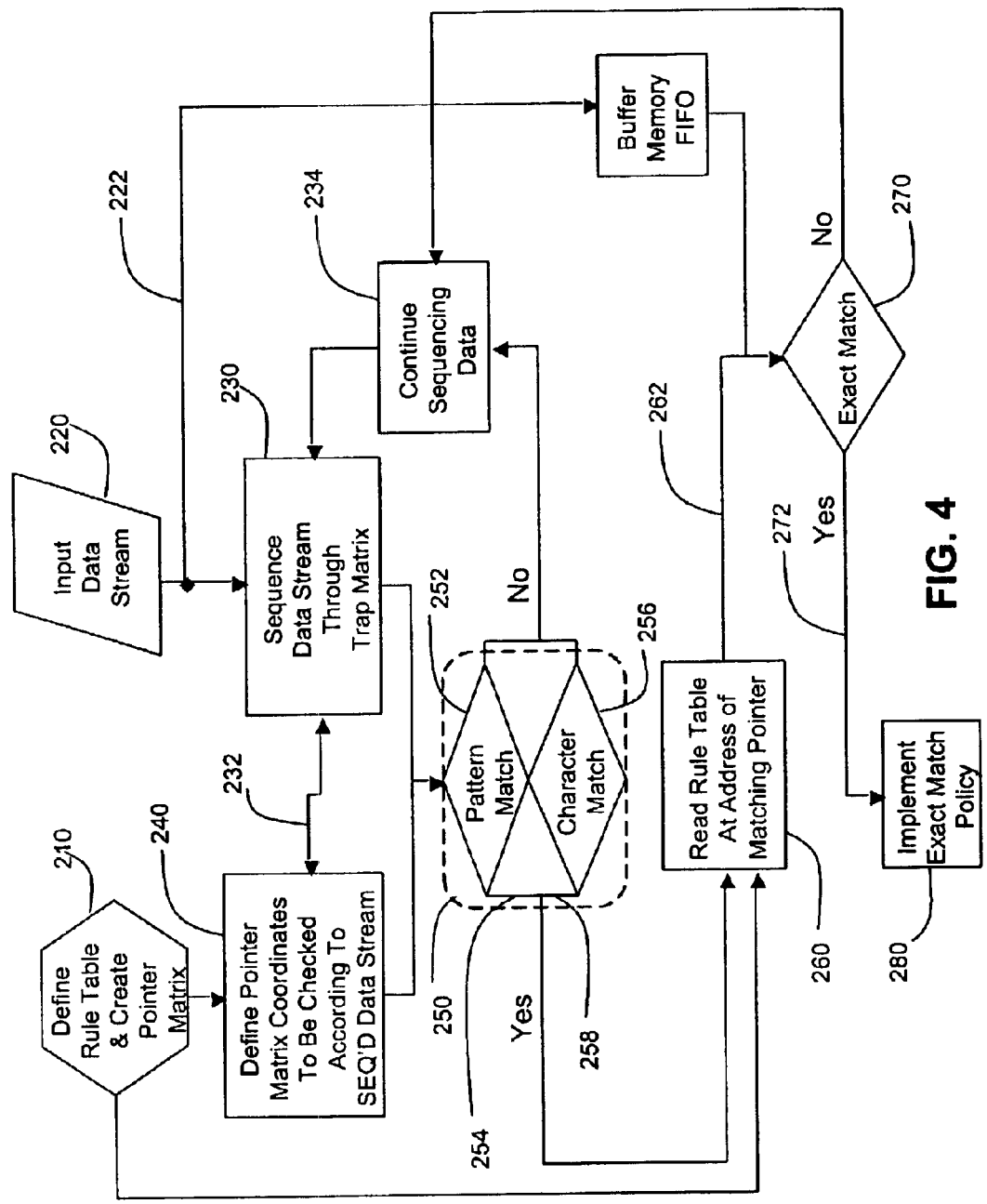
FIG. 4 illustrates a block flow diagram of the operation of the content searching engine according to the present invention.

The operation of the system is now generally described with reference to FIG. 4 and is described again in more detail below with reference to the preferred embodiment of the invention. Generally, the rule table 18 and corresponding pointer matrix 38 are defined at preparation step 210, and the data stream 24 is communicated through the input 14 at input step 220. According to step 222, the buffer memory 20 is preferably a first-in-first-out (FIFO) memory for bypassing the trap matrix 12 with the multiplex bypassed data stream 68.

The content searching engine 10 sequences the data stream 24 through the trap matrix 12 at process step 230. In particular, the data stream 24 is communicated in the multiplexed manner through the series of delay elements 50 and each one of the memories 52 according to the hierarchy of trap elements 48. Process step 240 defines the row and column coordinates 42 of the pointer matrix 38 that are queried 232 by each one of the trap elements 48 based on the sequenced data stream 70. Each one of the trap elements 48 performs the pattern match check 252 according to decision step 250. In particular, each one of the comparators 54 can query 232 the pointer matrix 38 by defining the row and column coordinate according to the hierarchy of the trap elements 48 and according to the pattern of the sequenced data 70 in each one of the corresponding memories 52. Generally, the content searching engine 10 proceeds to the exact match lookup 16 following the positive pattern match 254. When the content searching engine 10 proceeds to the exact match lookup 16, it should be appreciated that the matching trap element defines the row and column coordinate for the one-to-one pointer, and it is this trapped one-to-one pointer that defines the table address for the potentially matched term in the rule table 18. When there is not a positive pattern match 254, the content searching engine continues to sequence data 234 according to process step 230.

As particularly discussed above with reference to the preferred embodiment of the trap matrix 12 for the content searching engine 10, the comparators 54 "can query 232 'the active control matrix 86 at the row and column coordinate corresponding with the hierarchy of the trap elements 48 and with the pattern of the summed and truncated sequenced data 70. Additionally, as discussed above with reference to the preferred embodiment, the comparators 54 may also perform the character match check 256 when there is a positive pattern match 254. The combination of the pattern match check 252 and the character match check 256 significantly reduces any chance for a false positive based on the patterns in the compressed and truncated data stream 70. Therefore, to proceed to the exact match lookup 16, the preferred embodiment requires both the positive pattern match 254 and the positive character match 258. According to the preferred embodiment, when either the pattern match check 252 or the character match check 256 is negative, the content searching engine continues to sequence data 234 according to process step 230.

As discussed above, one of the terms 26 from the rule table 18 must be read to perform the exact match lookup 16. Therefore, as discussed above and according to process step 260, the potentially matched term 262 is read from the rule table 18 at the address corresponding with the trapped one-to-one pointer. In process step 270, the exact match lookup 16 compares the potentially matched term 262 with the bypassed data flow 68. The exact match lookup 16 identifies an exact match 272 when the bypassed data flow 68 has the exact same characters in the same combination, and the same case for case sensitive terms, as the potentially matched term 262. According to process step 280, a system executing the content searching engine 10 will generally proceed with some policy based on the exact match 272.

Based on the example of the character compression discussed with reference to Table 2 above, an example of using the character match check 256 in combination with the pattern match check 252 to reduce the chance for a false positive based on the patterns in the compressed data stream 70. As discussed above, when the rule table 18 includes the term "get passwd", a pattern for the term can be equivalently expressed according to the sum of its hexadecimal character values, i.e., "get passwd"⇒0x3E2. The term "get passwd" has ten (10) characters. Therefore, with reference to Table 3 below and according to the above description of the preferred embodiment, of the invention, the tenth ($10^{th}$) trap element would identify a positive pattern match and a positive character match for the data stream between times 13 and 22, inclusive (i.e., trap g-e-t- -p-a-s-s-w-d). As discussed in detail below, although the $10^{th}$ trap element may also identify a positive pattern match for the data stream between times 1 and 10, inclusive (G-o-t- -P-i-s-s-e-d), a false positive is averted by the character match. In particular, the character match between the final two characters in the term, "w-d", is not the same as the final two characters in the data stream, "e-d".

It will be appreciated that none of the trap elements 48 other than the $10^{th}$ trap element would trap "g-e-t- -p-a-s-s-w-d" because the hierarchy of the $10^{th}$ trap element corresponds with terms having character lengths equal to ten (Hierarchy=10≈Character Length=10) whereas the hierarchy of the other trap elements corresponds with terms having character lengths greater than or less than ten (Hierarchy>10≈Character Length>10Hierarchy<10≈Character Length<10).

TABLE 3

EXAMPLE OF DATA STREAM

| TIME | 22 | 21 | 20 | 19 | 18 | 17 | 16 | 15 | 14 | 13 | 12 | 11 | 10 | 09 | 08 | 07 | 06 | 05 | 04 | 03 | 02 | 01 |
|------|----|----|----|----|----|----|----|----|----|----|----|----|----|----|----|----|----|----|----|----|----|----|
| DATA | d  | w  | s  | s  | a  | p  |    | t  | e  | g  | Z  | A  | d  | e  | s  | s  | i  | P  |    | t  | o  | G ⇒ |

According to the description of the preferred embodiment above, the data stream 24 is sequenced through each one of the trap elements 48 according to the hierarchy of the trap elements 48. In particular, the hierarchy of the $10^{th}$ trap element corresponds with a combined character length of 10. Assuming that the values of the characters are set using the case control module 22, the values for the "G-o-t- -P-i-s-s-e-d" stream of data characters would be sequenced through the trap elements 48 according to the values for "g-o-t- -p-i-s-s-e-d" data characters. Therefore, in times 1 through 10, inclusive, the character values for "g-o-t- -p-i-s-s-e-d" in the sequenced data stream are summed and truncated according to Equations 1 and 2, respectively (the summation and truncation is a particular example of generally combining the ten characters). As discussed above, summing and truncating the character values for "g-o-t- -p-i-s-s-e-d" results in the hexadecimal value of 0xE2.

The $10^{th}$ trap element queries the active control matrix 86 at the row and column coordinate corresponding with its hierarchy (10) and with the pattern of the summed and truncated sequenced data (E2). Of course, since the term "get passwd" has a length of 10 characters and its truncated compressed character value is E2, the table address of the term is stored at the corresponding row and column coordinate, i.e., [10, E2]. Similarly, "got pissed" also has a length of 10 characters and its truncated compressed character value is also E2. However, the rule table 18 does not contain the term "got pissed". Therefore, the memory in the $10^{th}$ trap element traps the truncated compressed character value for "g-o-t- -p-i-s-s-e-d" and the comparator in the $10^{th}$ trap element identified a positive pattern match.

It will be appreciated that the set of flags 88 in the active control matrix 86 correspond with the set of table addresses 28 in the pointer matrix 38. Therefore, since the active control matrix 86 and pointer matrix 38 use the same row and column coordinate system, the flag is set at the row and column coordinate [10, E2]. Accordingly, the character length and truncated compressed character value for "g-o-t- -p-i-s-s-e-d" is [10, E2], resulting in the positive pattern match. However, the character match between the final two characters in the term, "wd", is not the same as the final two characters in the data stream, "e-d". Therefore, the comparator in the 10$^{th}$ trap element would not identify any character match, averting the false positive that could result from using the pattern match alone. Of course, a false positive would not necessarily result in any error because, as a result of the positive match, the content searching engine 10 merely proceeds to the exact match lookup 16, at which point any false positive would be identified as such because the uncompressed data characters communicated through the buffer memory 20 that correspond with the false positive match would not be identical to the term in the rule table (i.e., "g-o-t- -p-i-s-s-e-d" ≠ "get passwd").

Figure 5:
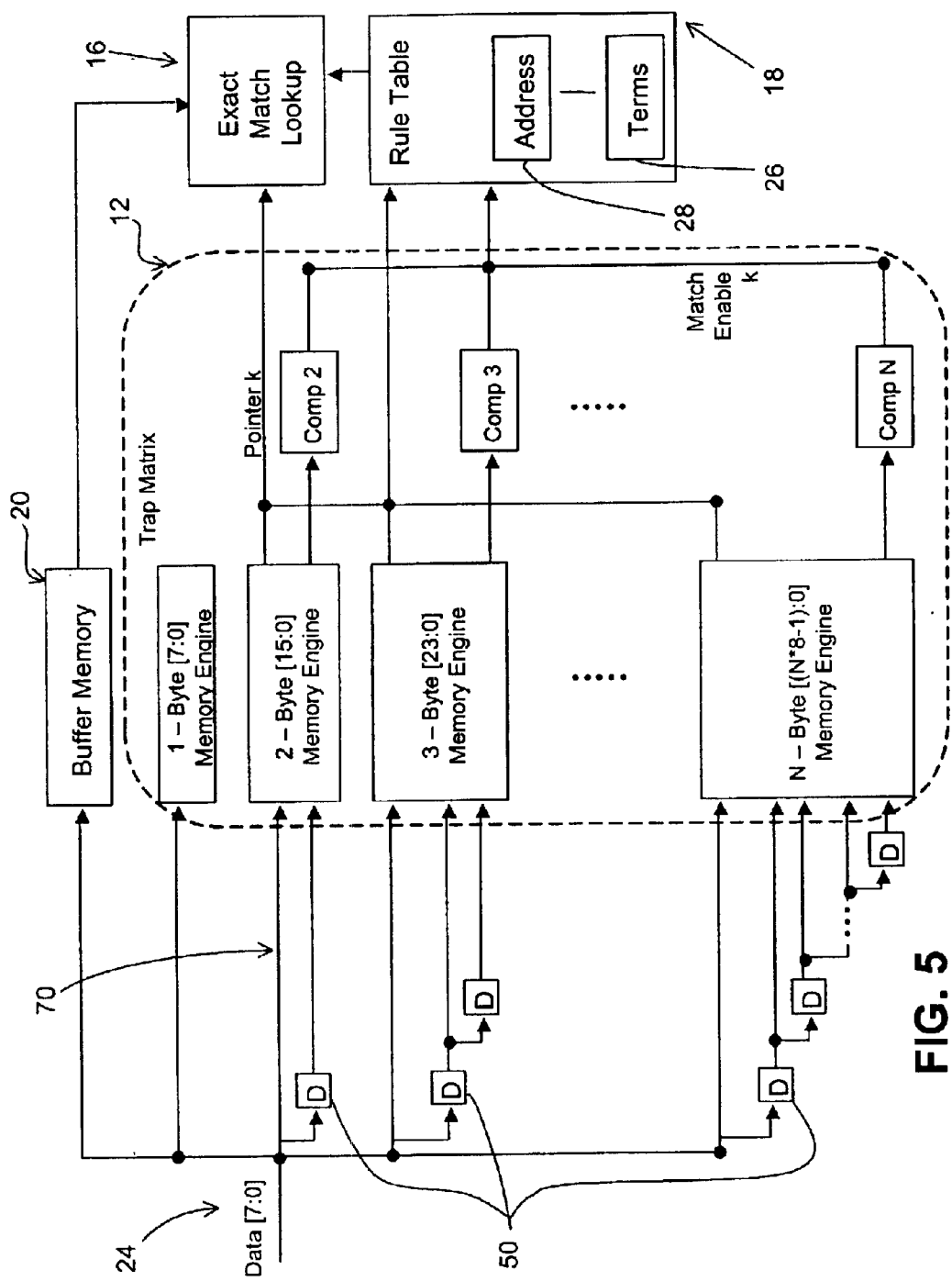
FIG. 5 illustrates a schematic diagram view of an alternative embodiment of the present invention.

An alternative embodiment of the trap matrix 12 in the content searching engine 10 is illustrated in FIG. 5. According to this embodiment, the entire data stream 24 may be sequenced through the trap elements 48 without any compression. As discussed above, the characters in the sequenced data stream 70 that are combined in each of the memories 52 are based on the hierarchy of the trap elements 48, and the hierarchy of the trap elements is defined by the series of delay elements 50 between the input device 14 and each one of the memories 52. It should be appreciated that the character-length of the sequenced data stream 70 that is trapped in each one of the memories 52 corresponds with the size of the memories 52. However, without any compression of the sequenced data stream 70, the size of the memories 52 increases exponentially with each additional character to be stored in the memories 52.

For example, a 2-byte memory engine must be able to trap two (2) single-byte characters, and a 3-byte memory engine must be able to trap three (3) single-byte characters. Each single, eight-bit byte can be used to define up to 256 potential characters ($2^8$=256). Therefore, for the 2-byte memory engine to trap two (2) successive single-byte characters, the 2-byte memory engine has a memory size of 8,192 bytes, which is $(2^8)^2$. Similarly, for the 3-byte memory engine to trap three (3) successive single-byte characters, the 3-byte memory engine has a memory size of 2,097,152 bytes (about 2 mega-bytes), which is $(2^8)^3$. The reason that the size of the memories increases exponentially without compression is because the memory engines are accommodating for any potential combination of characters in the data stream 24 so that the memory engine can trap the uncompressed characters according to each of the various combinations for the set of terms 26 in the rule table 18. Generally, the largest N-byte memory engine can trap the longest uncompressed sequenced data stream 70 which has N-successive single-byte characters, and the N-byte memory engine has a memory size generally defined by Equation 4.

Memory Size=$(2^8)^N$, where N=Number of Trapped Single-Byte Characters (4)

It will be appreciated that current technology for standard Random Access Memory (RAM) only allows for memory engines with the capacity to trap several single-byte characters due to the number of permutations between the sequenced characters and the potential combination of characters for the set of terms 26 in the rule table 18. Based on advances in Content Addressable Memory (CAM), larger single-byte characters may be effectively trapped by the CAM because the sequenced data 70 can be used as the operand to the CAM memory registers and the CAM only returns an address from the CAM if the operand corresponds with one of the one-to-one pointers. In RAM, the sequenced data 70 must be stored at specific address locations, resulting in the exponential growth of the memory. In the CAM, the sequenced data 70 is supplied to the memory as the operand and, in a single clock cycle, the CAM returns the address in the CAM if a corresponding match is found. It will be appreciated that the use of the CAM can be used either with compression or without compression of the characters in the sequenced data stream 70. Without compression of the sequenced data 70, it will be appreciated that the CAM can be implemented in the trap matrix 12 as the memory-comparator pairs 56, and in such a trap matrix 12, the contents of the CAM would contain the set of one-to-one pointers.

Generally, the trap matrix 12 can simultaneously search the sequenced data stream 70 for character patterns, whether the characters are uncompressed or compressed and/or truncated, that match the corresponding patterns of the characters for each one of the terms 26 in the rule table 18. As described above, the simultaneous search is conducted in each of the trap elements 48. In particular, the memory-comparator pairs 56 in each one of the trap elements simultaneously trap the combination of characters (again, whether the characters are uncompressed or compressed and/or truncated) and compare the patterns of the combination of characters in the sequenced data stream 70 with the corresponding patterns of the terms 26. The length of the characters being combined and trapped in the memory-comparator pairs is defined according to the hierarchy of the trap elements 48 and corresponds with the length of the terms 26 being compared to the trapped combined characters.

Figure 6A:
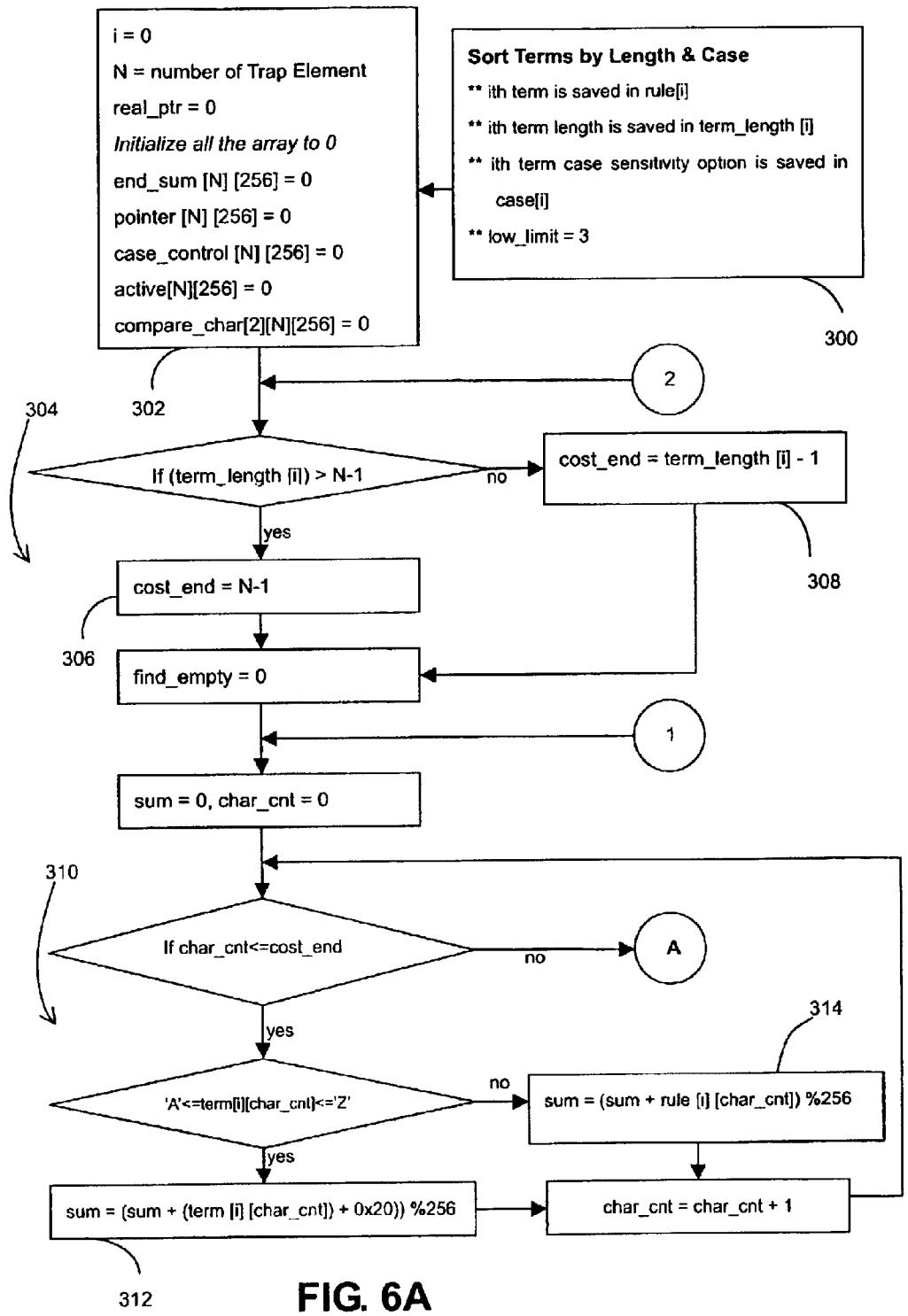
FIGS. 6A–6C illustrate a detailed block flow diagram of the process for generating the pointer matrix and active control matrix according to the rule table and in accordance with the preferred embodiment of the present invention.
Figure 6B:
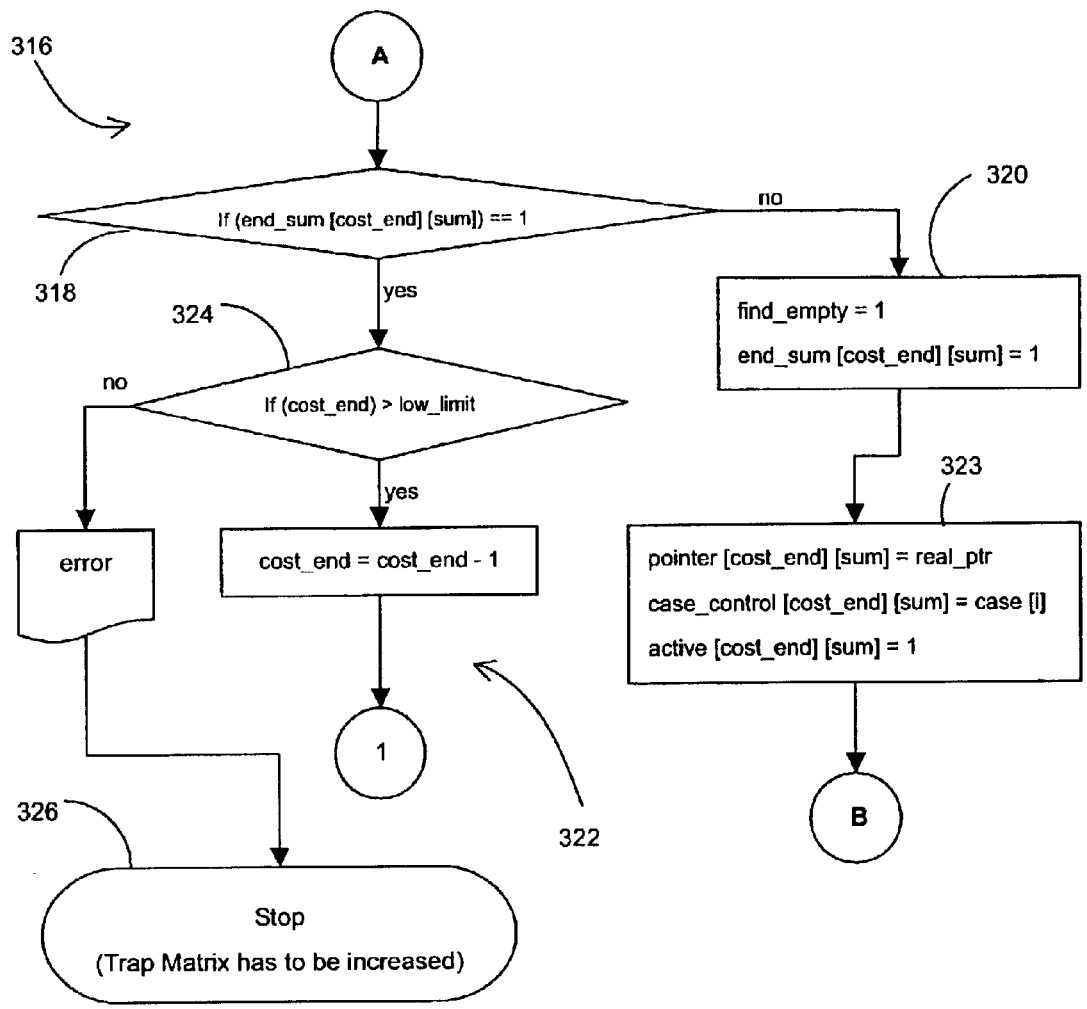
Figure 6C:
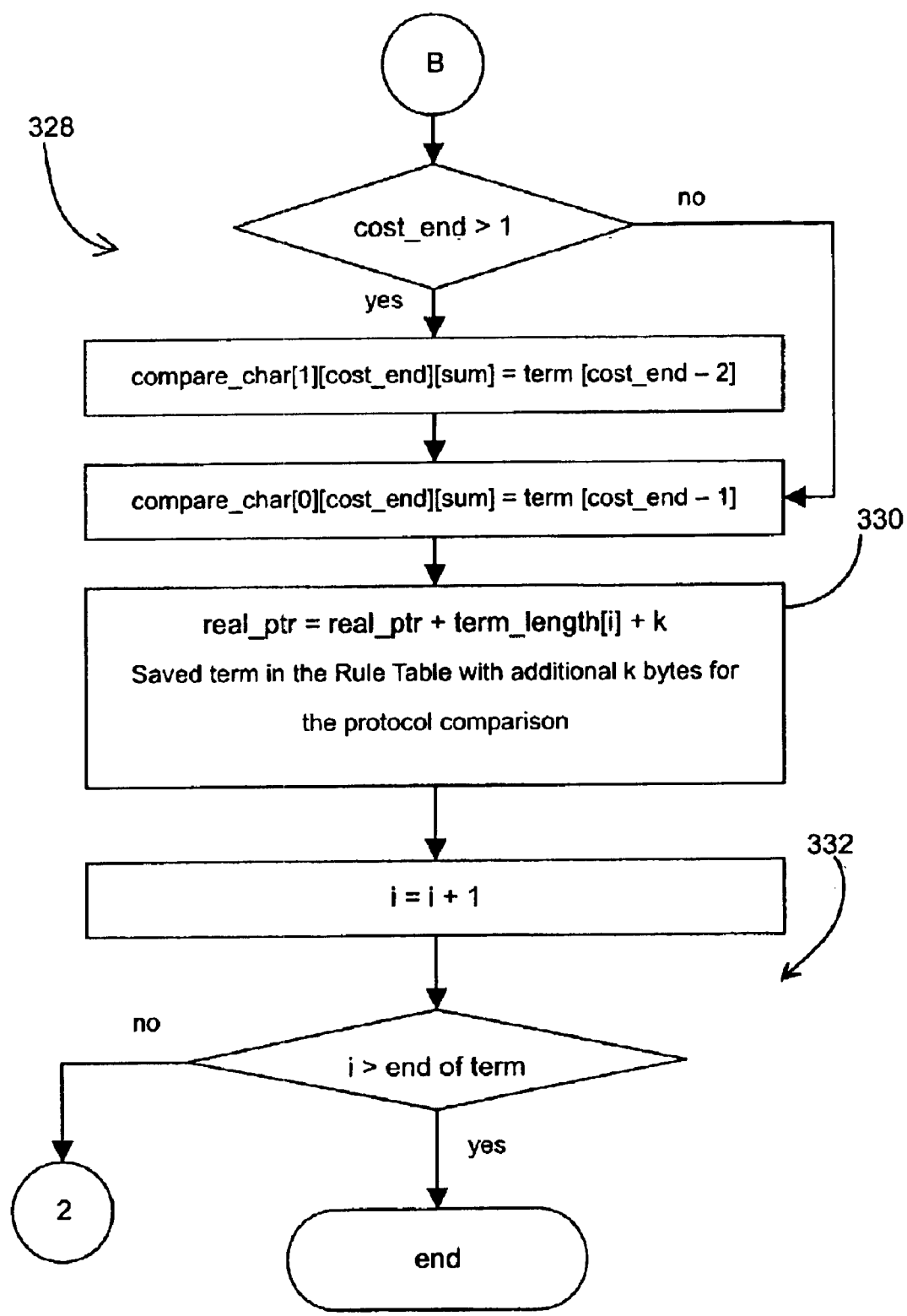
Figure 7A:
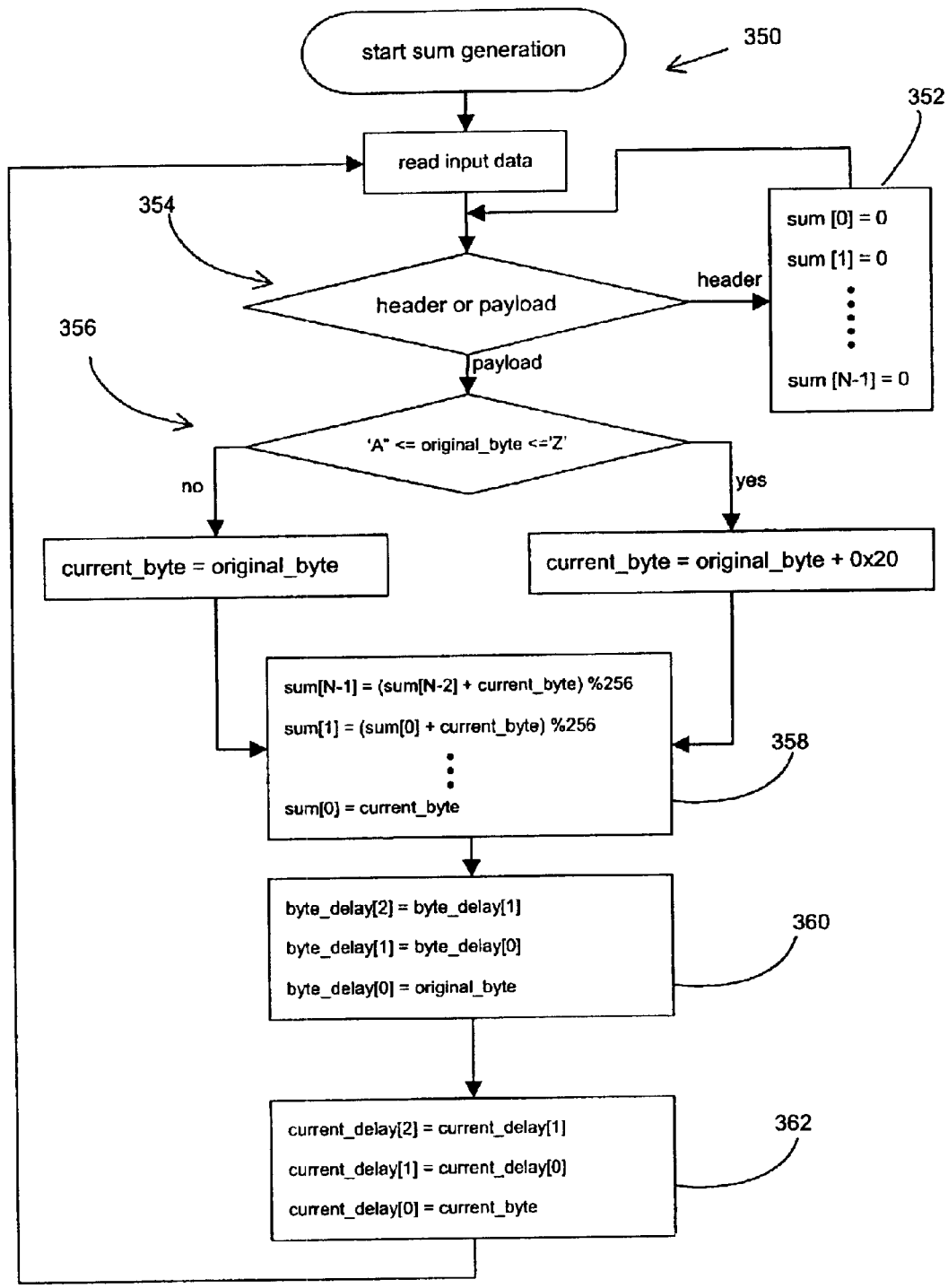
FIGS. 7A–7C illustrate a detailed block flow diagram of the processes for pattern matching, character matching, and the exact match lookup in accordance with the preferred embodiment of the present invention.
Figure 7B:
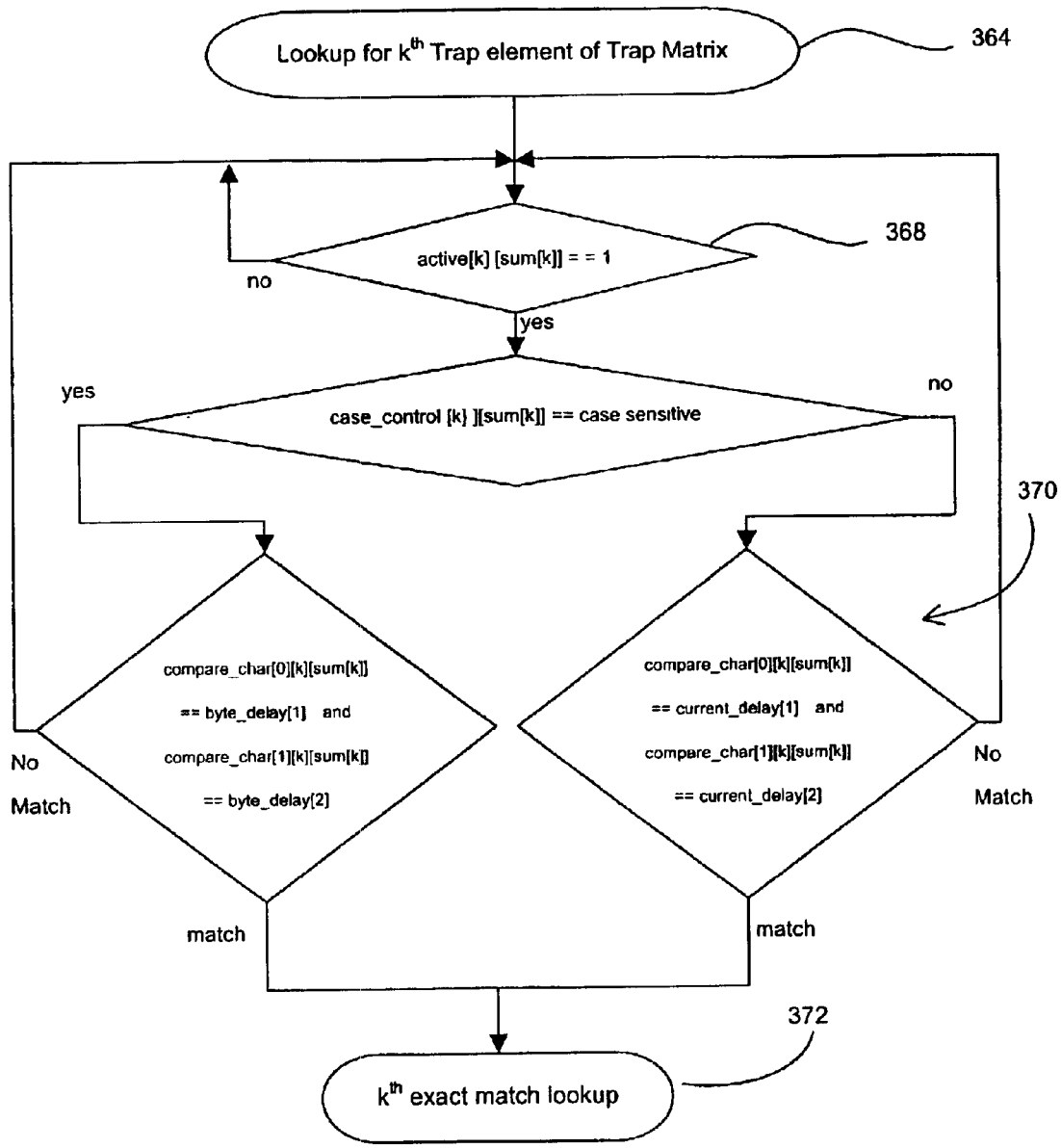
Figure 7C:
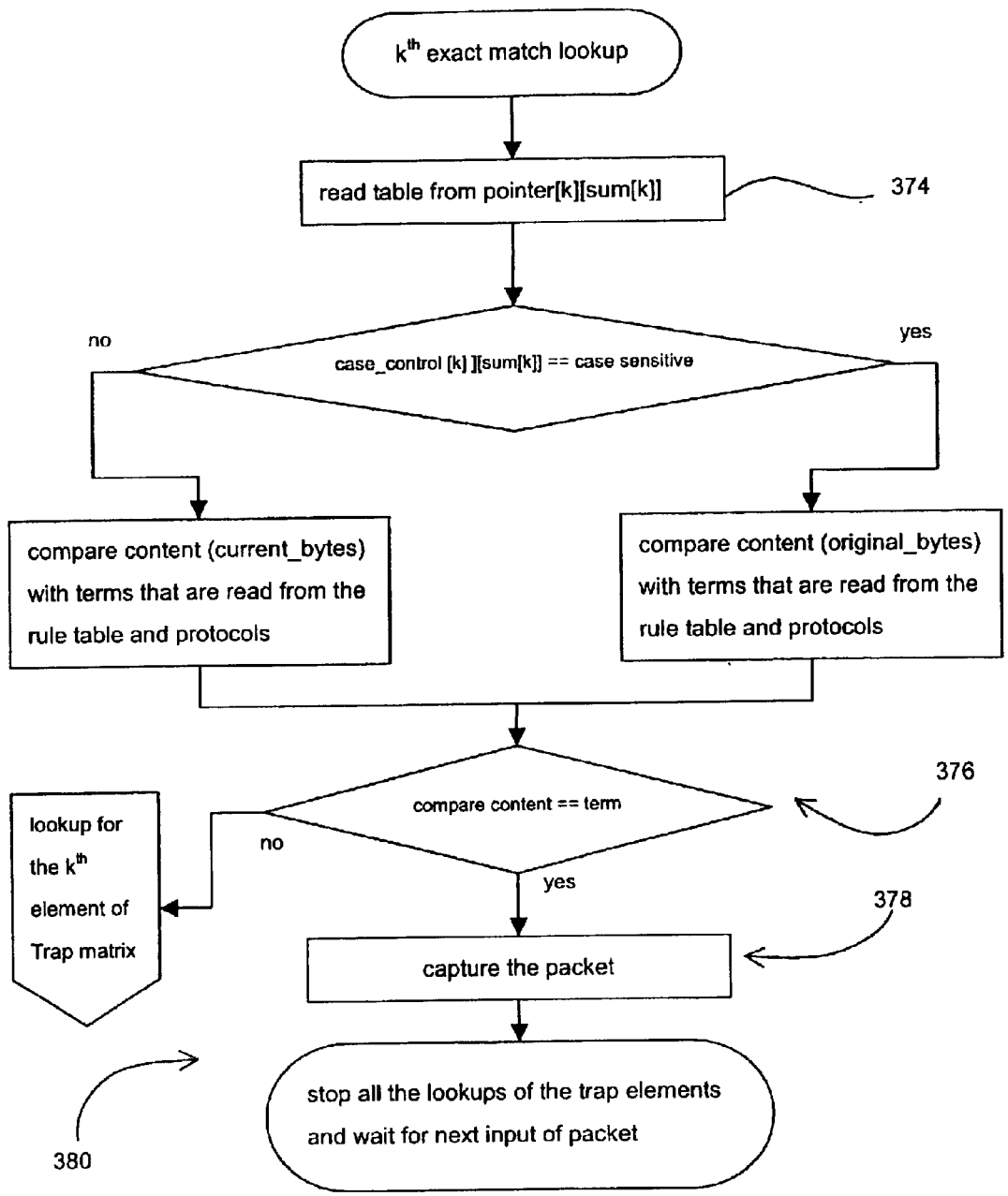

With reference to FIGS. 6 and 7, the operation of the content searching engine is now described in detail for the preferred embodiment of the invention. In particular, the generation of the pointer matrix 38 and active control matrix 86 according to the rule table 18 is illustrated in FIGS. 6A–6C. The operation of the trap matrix 12, including the pattern match check and the character match check, and the exact match lookup 16 are illustrated in FIGS. 7A–7C.

Referring to FIG. 6A, the generation of the rule table 18 preferably begins by sorting the set of terms 26 in the rule table 18 by length and case 300, resulting in the set of N rule tables 102 discussed above. Terms that are not case sensitive are preferably set to lower case characters, and case sensitivity is preferably applied only for the ASCII values of the terms. As discussed above, the set of terms 26 includes at least one term and there may be many terms 26 in the rule table 18. For the set of terms 26, the i$^{th}$ term, i$^{th}$ term length, and i$^{th}$ term case sensitivity ate saved in term[i], term_length[i], and case[i], respectively. A lower limit for term length (low_limit) is set to an integer value, preferably a low number such as three (3).

The generation of the pointer matrix 38 and the active control matrix 86 begins with the initialization of the variables and arrays are initialized 302. In particular, the set of pointers 40 in the pointer matrix 38 are preferably set to zero and the set of flags 88 in the active control matrix 86 are also preferably set to zero. The variable "N" is used as a reference to the number of trap elements, and as discussed above, the particular embodiment uses both a compression operation and truncation for the sequenced data 70 resulting in a single byte pattern. Accordingly, the size of the matrices, the number of rows by the number of columns, can be limited to Nx256.

As discussed above, it is preferable for the number of trap elements (N) to be equal to the maximum character length of the longest term. However, the pointer matrix 28 and the active control matrix 86 can be set up such that the trap matrix 12 can trap sequenced data 70 for terms 26 that have character lengths that are longer than the number of trap elements (term_length>N) 304. This is done by limiting the number of the characters used for the pattern match and character match to, at most, the first N-characters in the terms (cost_end) 306. Of course, for terms that have a number of characters less than or equal to N-characters, the actual length of the term can alternatively be used to define the number of the characters (cost_end) that are used for the pattern match and character match 308.

As discussed above with reference to the preferred embodiment, defining the pattern for each term begins by performing a numerical operation on each character in the term and truncating the result of the numerical operation 310. According to the preferred embodiment, the trap matrix 12 is not case sensitive, and any upper case character in the term is operated on as a lower case character (+0x20) 312. According to the particular example, the character values of each term are summed and truncated to the least significant bits of a single byte (sum % 256) 312, 314.

As discussed above, for each one of the terms having an equal character length (cost_end=i), the set of pointers for these equal-length terms are stored according to the character length and the truncated sum value. Therefore, for these equal-length terms, the present invention ensures that each one of these equal-length terms has a different truncated sum for its particular pattern. Referring to FIG. 6B, sub-process A ensures that each of the equal-length terms has a different truncated sum 316. Sub-process A uses a set of uniqueness flags (end_sum[cost_end][sum]) to determine whether a particular truncated sum has already been used for terms having the equal character length 318. The matrix containing the set of uniqueness flags (end_sum [cost_end][sum]) is based on the same row and column coordinates as the pointer matrix 38, and the uniqueness flags are initialized to zero (0). Whenever a truncated sum is calculated for a term, the uniqueness flag bit is set high to one (1) for the particular character length (cost_end) and truncated sum (sum % 256) of the term 320.

If no other term with the same character length produces the same truncated sum, the pointer value (real_ptr) is added to the set of pointers in the pointer matrix (pointer [cost_end][sum]) according to the particular character length and truncated sum 322. Additionally, the corresponding case control flag (case[i]) and active control flag (high bit) are respectively stored in the case control matrix (case_ control[cost_end][sum]) and active control matrix (active [cost_end][sum]) of the trap matrix 12. In comparison, if another term with the same character length produces the same truncated sum, the number of characters in the term that are used to calculate the truncated sun is reduced and a new truncated sum is computed accordingly 322. When reducing the number of characters used for calculating the truncated sum, it is preferable to ensure that the number of characters is greater than the lower limit for term length. If this character reduction process does not work, it is likely to be an indication that the trap matrix 12 should be increased 326. For example, if there are N terms that all begin with the same N characters, the trap matrix 12 may be increased by the number of trap elements. As another example, it is possible that the truncated sums of a number of terms may have identical least significant bits even though the non-truncated sums may be quite different according to their most significant bits, and the trap matrix 12 in this case could be increased by the size of the memory 52 in each one of the trap elements 48. It will be appreciated that the truncation of the compressed character value is optional and the size of the memories in each one of the trap elements can be sized according to the hierarchy of the trap elements and the corresponding maximum possible compressed character value that could be stored in the memory. In particular, without any truncation of the compressed character value, at each hierarchy of the trap elements, the memories could be sized according to Equation 5.

$$\text{Memory Size}=(2^8)*(2^x), x \geq \log(k)/\log(2), k=k^{th} \text{ trap element hierarchy} \quad (5)$$

As discussed above, when the truncated sum is used in the pattern match, it is preferable to use a second matching technique to avoid false positives. For example, two uncompressed characters from each term can be used in the character match. Therefore, after sub-process A has ensured that a particular term has a different truncated sum from other terms with the same length, these uncompressed characters can be selected from the term. Referring to FIG. 6C, sub-process B selects a couple of characters from the end of the truncated and summed term and stores the uncompressed characters in a pair of character matrices (compare_char[0,1][cost_end][sum]) 328. Additionally, even though the length of the term used for the pattern match and character match does not necessarily use every character in the term, the entire length of the term can be stored in the rule table 18, and the pointer value (real_ptr) is set accordingly 330. In particular, the pointer value is incremented to the starting pointer value for the next term (term[i+1]) by adding the entire character length of the current term (term_ length[i]) and any additional length (k bytes), such as for a header information that may be used in a protocol comparison. The term counter is incremented by one and the process is repeated for the next term until the end of the rule table is reached 332.

Referring to FIG. 7A, the pattern match check, character match check, and the exact match lookup begin by reading the data from the input and sequencing the data stream through the set of trap elements 350. At the beginning of the data stream, the truncated sum in the memory 52 of each one of the trap elements 48 is initialized to zero (0) 352. For example, if the data stream is a data packet having a header and a payload, the truncated sum can be initialized when the header is identified and the summation can truncation of the payload can begin 354. As discussed above, numerical operations other than summation may be used according to the operation performed on the terms in the rule table. As discussed above, the trap matrix 12 of the preferred embodiment is not case sensitive, and any upper case character in the data stream is operated on as a lower case character (+0x20) 356. According to the particular example, the character values are simultaneously summed and truncated in each one of the trap elements 358. As discussed in detail above, the number of characters used for the summation in each of the trap elements depends on the hierarchy of the trap elements.

As discussed above, uncompressed characters are also communicated to the trap elements for the character match. According to the particular example, the original character and the current character are both delayed by two clock cycles so that the second to last and third to last characters (byte_delay[1,2], current_delay[1,2]) are ready to be compared with the corresponding second to last character and third to last character of the term, as stored in the pair of character matrices (compare_char[0,1][cost_end][sum]), should a pattern match occur in any one of the trap elements 48. The original character is delayed for the case in which the pattern match occurs for a term that is case sensitive 360. The current character is delayed for the case in which the pattern match occurs for a term that is not case sensitive 362.

Referring now to FIG. 7B, the process for the pattern match and character match is simultaneously performed in each one of the trap elements 48. The process is generally described with reference to the $k^{th}$ trap element in the trap matrix 364. The comparator for the $k^{th}$ trap element performs the pattern match check by determining whether the flag in the active control matrix is set high at the row and column corresponding to the hierarchy of the $k^{th}$ trap element and the truncated sum value in the memory of the $k^{th}$ trap element (k, sum[k]) 368. A match indicates a positive pattern match between the sequenced data and the term and the comparator proceeds to the character match check based on the case sensitivity of the term. If there is no positive match in either the pattern match check or the character match check, the next character is sequenced through the trap elements and the process begins again. When there is a positive match in both the pattern match check and the character match check, the trap element provides the pointer to the $k^{th}$ exact match lookup 372. In particular, the pointer for the $k^{th}$ exact match lookup is taken from the row and column of the pointer matrix that corresponds with the matching trap element (k, sum[k]).

Referring now to FIG. 7C, the particular term for the $k^{th}$ exact match lookup is read from the rule table 374. In particular, the term is read from the address equal to the pointer for the $k^{th}$ exact match lookup (pointer[k][sum[k]]). Accounting for any case sensitivity, the actual content that had been bypassed through the buffer memory is then compared with the term from the rule table 376. If the content searching engine 10 identifies an exact match between particular content in the data stream and any term in the rule table, the system executing the will generally proceed with some policy based on the exact match 378. For example, the system may capture the packet as well as perform other steps based on the exact match. The process for sequencing data and performing the pattern match check, the character match check and the exact match lookup can then be repeated 380.

Figure 8:
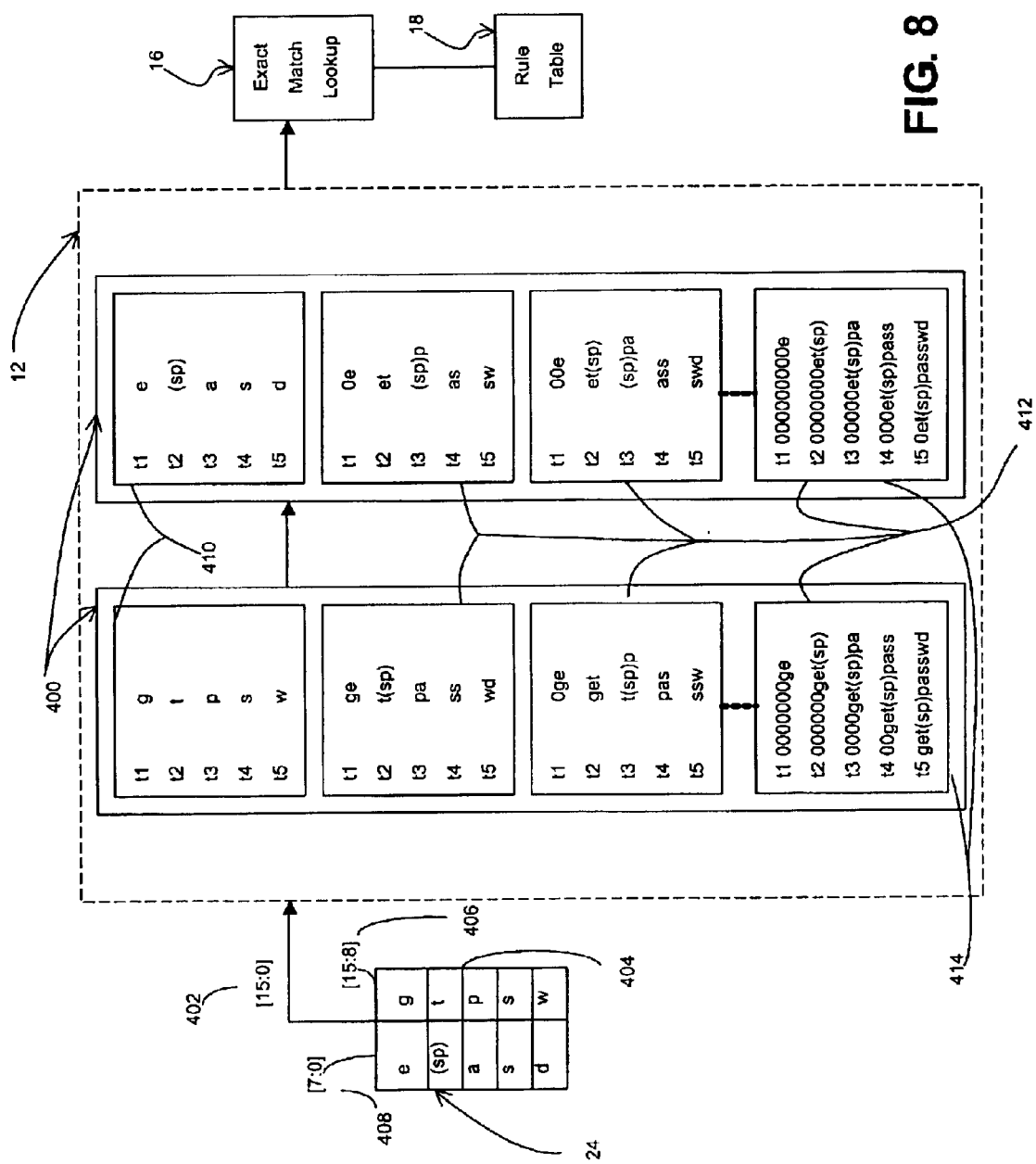
FIG. 8 illustrates a schematic diagram view of a scaled embodiment of the present invention.

Referring to FIG. 8, the trap matrix 12 can be scaled with multiple sets of trap elements 400. For example, in the case in which the data stream 24 has a bit-width of sixteen (16) bits 402, the data characters 404 can be alternatively sequenced through the sets of trap elements 400. In particular, the most significant bit data characters 406 and least significant bit data characters 408 can be respectively sequenced through the first pair of trap elements 410. The characters can be summed or otherwise sequenced through the pairs of hierarchical trap elements 412 and a pattern match may be determined in any one of the hierarchical trap elements 412. For example, when "g-e-t- -p-a-s-s-w-d" is in the data stream 24 and the term "get passwd" is in the rule table 18, the data stream may be trapped in either one of the 10th hierarchical trap elements 414. As particularly illustrated, the stream being trapped may begin with "g" in the most significant bit and would be trapped in the corresponding one of the 10th hierarchical trap elements 414. It will be appreciated that the data stream could begin with "g" in the least significant bit and would be trapped in the other one of the 10th hierarchical trap elements 414. It will be further appreciated that the scalability of the trap matrix 12 allows for greater bit-widths with even more sets of trap elements.

Figure 9:
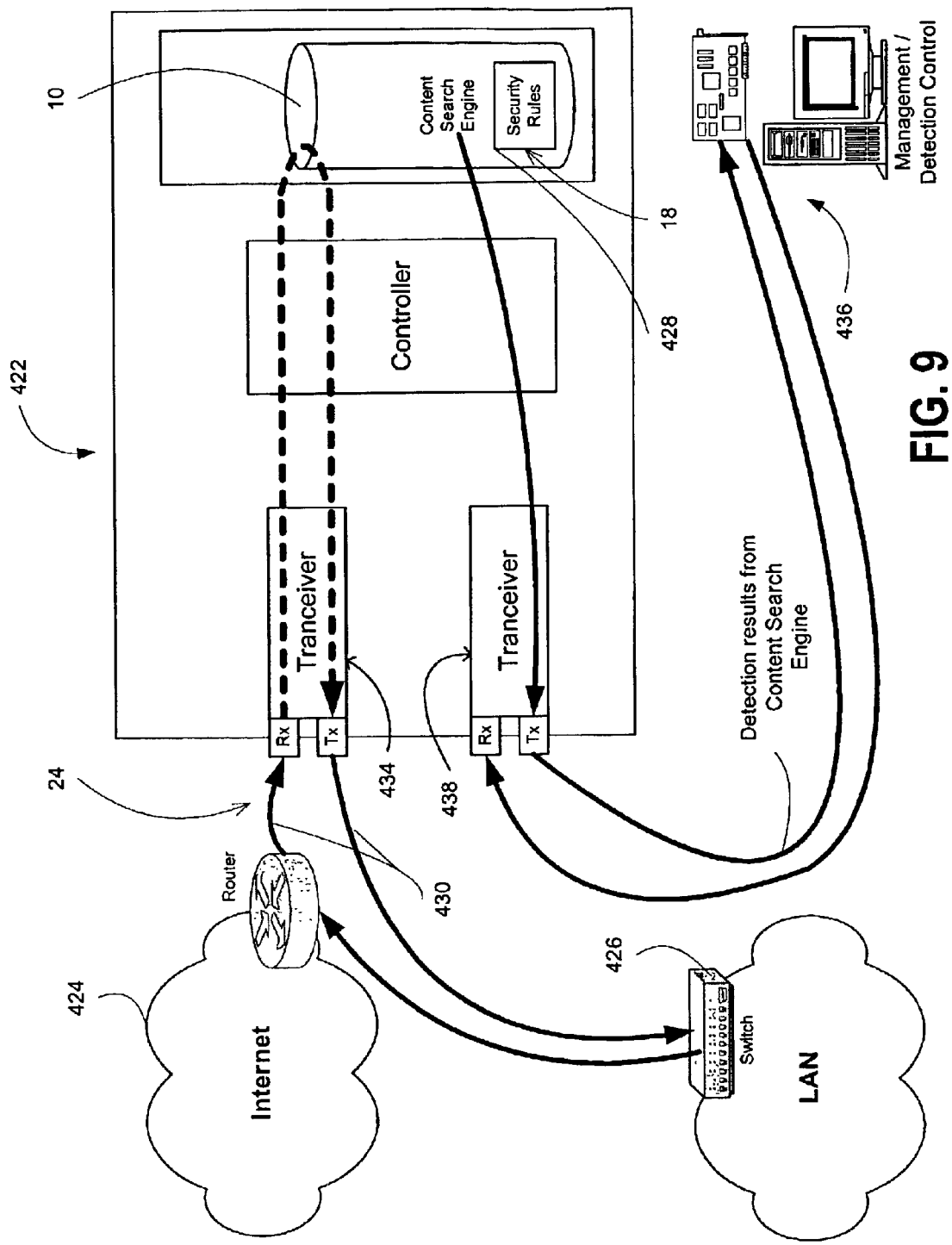
FIGS. 9 and 10 illustrate schematic diagram views of the content searching engine integrated into an intrusion detection system according to the present invention.
Figure 10:
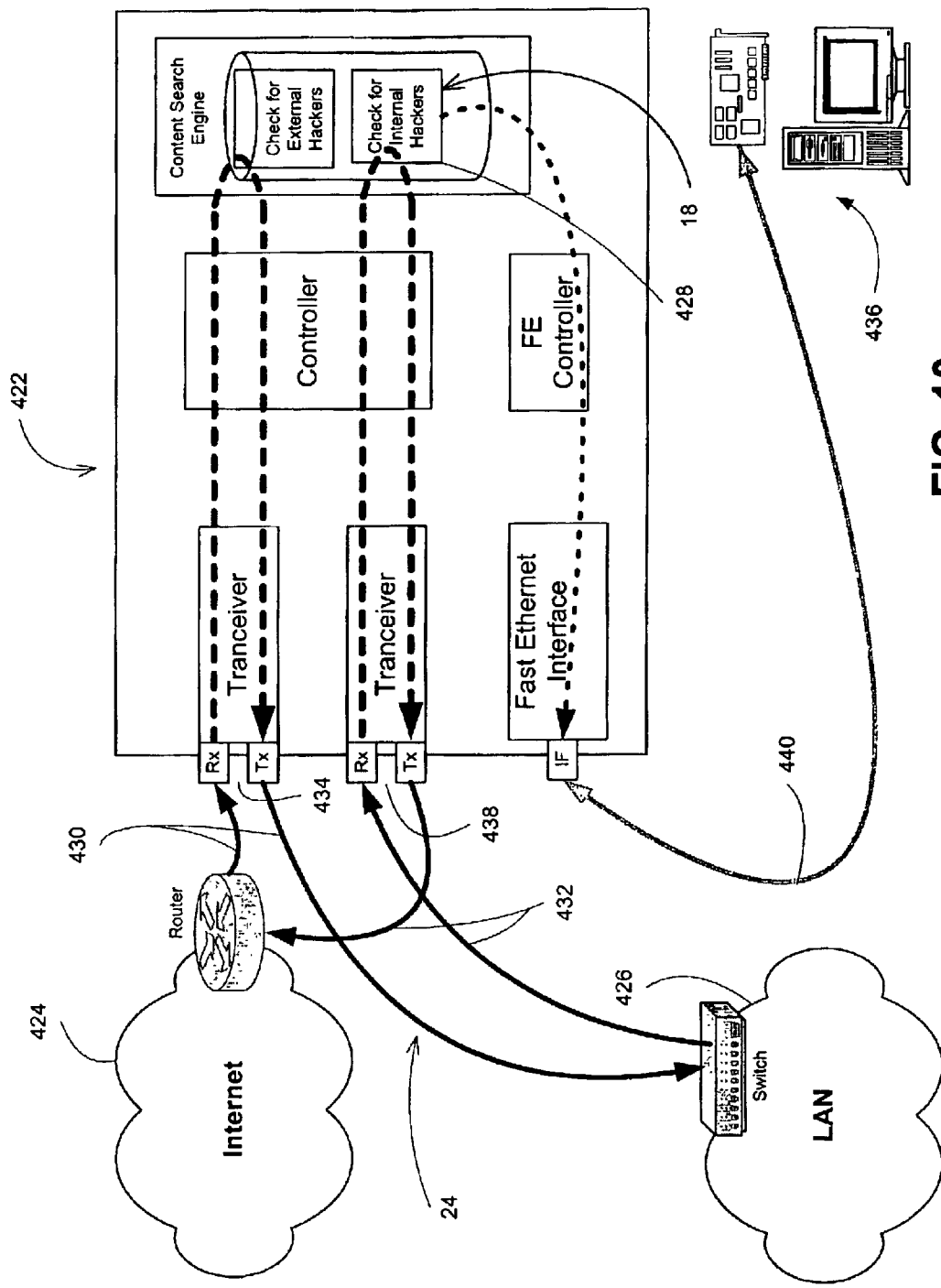

The content searching engine 10 can be incorporated into any content searching system. For example, the content searching engine 10 may be incorporated into an intrusion detection system 422 between an external computer network 424 and an internal computer network 426, as shown in FIGS. 9 and 10. In each application of the intrusion detection system 422, the terms 26 in the rule table 18 are a set of security rules 428 that contain terms that are known to be used in computer hacking, such as attempting to gain unauthorized access to computer networks 426, 428. For the particular application of the intrusion detection system 422 shown in FIG. 10, it is evident that the set of security rules 428 may be used to check entering data packets 430 and/or emanating data packets 432. It will be appreciated that, by checking the entering and emanatin g data packets 428, 430, the intrusion detection system 422 can be used even more generally as a computer security system. For example, in addition to checking for hacking terms, the security rules 428 can also be defined to search for other types of security breaches that may be attempted through the computer system. For example, there could be certain terms that would indicate an attempt to communicate certain trade secrets through computer networks 426, 428. It will be further appreciated that the content searching engine 10 could even reside within the internal computer network 426 to check for hacking amongst computers within the network and to check for evidence of corporate espionage, including unauthorized communications containing trade secrets and/or other valuable corporate intelligence, such as customer lists, vendor lists, employee salaries, and competitor information.

In the particular embodiments shown in FIGS. 9 and 10, the data stream 24 is communicated between the computer networks 426, 428 through at least one transceiver 434 in the content searching engine 10. The data stream 24 is sequenced through the content searching engine 10 as discussed in detail above. If an exact match is found between characters in the data stream 24 and the security rules 428, the matching portion of the data stream is trapped and sent to a detection control computer 436. The detection control computer 436 may log the trapped data stream and/or may implement a pre-defined policy rule according to the trapped data stream. According to the particular embodiments, another transceiver 438 may be used for communications between the detection control computer 436 and the content searching engine 10 (FIG. 9) or between the computer networks 426, 428 when checking both entering and emanating data packets 428, 430 (FIG. 10). As illustrated in FIG. 10, the detection control computer 436 can also be in communication with the content searching engine 10 through another type of interface, such as a fast ethernet connection. The transceivers can be an optical ethernet interface.

It will be appreciated that the set of patterns may be an exact character pattern set, a near-exact character pattern set, a character segment pattern set, a character operation pattern set, a truncated character operation pattern set, or even a combination of these pattern sets. An exact character pattern set is exemplified by an exact combination of characters, having the same identical characters in the same order and with same case, and a near-exact character pattern is exemplified by a combination of characters having the same characters in the same order but without any case sensitivity, such as may be implemented in the alternative embodiment and CAM described above. A character segment pattern set is exemplified by a combination of characters having the same characters in the same order, but only for a segment of each one of the terms, such as the character match operation and CAM described above. A character operation pattern set is exemplified by a combination of characters that are operated on by a numerical operator and/or logic operator, and a truncated character operation pattern set is exemplified by truncating the character operation pattern set, such as implemented in the preferred embodiment described above.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, it will be appreciated that the numerical operation may include an arithmetic operator, a comparison operator, and/or an aggregation operator (such as the summation operator). Thus, the breadth and scope of the present invention should not be limited by any of the above-described exemplary embodiments, but should be defined only in accordance with the following claims appended hereto and their equivalents.

What is claimed is:

1. A process for electronically searching a data stream, comprising the steps of:
   (a) defining a pointer matrix based on a set of terms, said terms comprising a plurality of term characters having a plurality of character lengths and a plurality of character combinations and said pointer matrix comprising a set of one-to-one pointers uniquely corresponding with said set of terms, wherein said one-to-one pointers are stored in said pointer matrix at row and column coordinates defined according to said character lengths and according to a set of patterns defined by said character combinations, and wherein said set of terms includes at least one term and said set of patterns includes at least one pattern corresponding with said at least one term;
   (b) receiving the data stream at an input device during a time period, the data stream comprising a set of data characters having a data length and a data combination and said time period comprising a plurality of clock cycles,
   (c) sequencing the data stream through a trap matrix during said time period, said trap matrix comprising a set of trap elements and a set of delay elements, wherein said trap elements are in multiplexed communication with said input device and wherein said trap elements have a hierarchy according to said set of delay elements, wherein an increasing series of said delay elements between each of said trap elements and said input device defines an increasing order in said hierarchy of said trap elements, said sequenced data stream comprising a set of data lengths according to said hierarchy of said trap elements, said sequenced data stream further comprising a set of data combinations, said set of data combinations corresponding with said set of data lengths according to said hierarchy of said trap elements; and
   (d) performing a pattern match check between said set of patterns and said set of data combinations in each of said trap elements according to said hierarchy of said trap elements.

2. A process according to claim 1, wherein said step for defining said pointer matrix further comprises the steps of:
   (i) defining said set of terms;
   (ii) storing said set of terms in a rule table according to a set of table addresses; and
   (iii) defining said set of one-to-one pointers as said set of table addresses.

3. A process according to claim 2, wherein said step for performing said pattern match check further comprises the step of reading one of said table addresses from said pointer matrix when said pattern match check results in a positive pattern match.

4. A process according to claim 3, further comprising the step of performing an exact match lookup when said pattern match check results in a positive pattern match.

5. A process according to claim 1, further comprising the steps of:
   calculating a set of compressed term values from said set of terms according to an operation on said term characters in said character combinations;
   calculating said combined character set according to said operation during said combining step; and
   defining said set of compressed term values as said pattern of said character combinations for said set of terms.

6. A process according to claim 5, further comprising the step of performing a character match check when said pattern match check results in a positive pattern match.

7. A process according to claim 6, further comprising the step of performing an exact match lookup when said pattern match check and said character match check result in a positive pattern match and a positive character match, respectively.

8. A process for searching a data stream, comprising the steps of:
   (a) defining a set of terms, said terms comprising a plurality of term characters having a plurality of character lengths and a plurality of character combinations associated with said character lengths, wherein said set of terms includes at least one term having a character length and a character combination;
   (b) storing said set of terms in a rule table according to a set of table addresses;
   (c) correlating said stored set of terms with said set of table addresses according to a pointer matrix, said pointer matrix comprising a set of one-to-one pointers and a set of row and column coordinates, said set of one-to-one pointers defined according to said set of table addresses and said row and column coordinates defined according to said character lengths and according to a set of patterns corresponding with said set of terms, wherein said set of patterns uniquely corresponds with said character combinations, and wherein said set of patterns includes at least one pattern corresponding with said at least one term;
   (d) receiving the data stream at an input during a time period, the data stream comprising a set of data characters having a data length and a data combination and said time period comprising a plurality of clock cycles,
   (e) sequencing said received data stream through a trap matrix during said time period, said trap matrix comprising a set of trap elements and a set of delay elements, wherein said trap elements are in multiplexed communication with said input and wherein said trap elements have a hierarchy according to said set of delay elements, wherein an increasing series of said delay elements between each of said trap elements and said input results in an increasing order in said hierarchy of said trap elements, said sequenced data stream having a set of data lengths according to said hierarchy of said trap elements and corresponding with said character lengths of said set of terms, and wherein said sequencing step further comprises the steps of:
(i) reading in parallel a current character from said input for each of said trap elements,
(ii) combining in parallel said current character with a set of previously combined set of characters according to said hierarchy of said trap elements, wherein said combined character set is associated with said clock cycles according to said hierarchy of said trap elements, and
(iii) shifting said combined character set through said set of delay elements and said set of trap elements according to said hierarchy, wherein said combined character set is shifted in said increasing order through said hierarchy of said trap elements;
(f) simultaneously checking said combined character set with said pattern of said character combinations for each of said data lengths, wherein said comparing step further comprises the steps of:
(i) defining said character lengths according to said hierarchy of said trap elements for each of said trap elements, respectively, and
(ii) determining whether said combined character set in any one of said trap elements matches a corresponding one of said patterns of said character combinations; and
(g) checking a portion of said received data stream with an exact term from said set of terms for an exact match therebetween when any combined character set matches said corresponding pattern of said character combinations, wherein said portion of said data stream corresponds with said clock cycles associated with said combined character set and wherein said exact term is stored at a table address according to a unique one-to-one pointer from said pointer matrix, said unique one-to-one pointer having a row and a column coordinate equal to said hierarchy of said one matching trap element and to said corresponding pattern of said character combinations.

9. A process according to claim 8, further comprising the steps of:
identifying a case-sensitive set of said terms according to a case-sensitive matrix;
defining said pattern of said set of terms independent of any case-sensitivity; and
setting each of said characters in said data stream to a single case at said input.

10. A process according to claim 8, further comprising the steps of:
calculating a set of compressed term values from said set of terms according to an operation on said term characters in said character combinations;
calculating said combined character set according to said operation during said combining step; and
defining said set of compressed term values as said pattern of said character combinations for said set of terms.

11. A process according to claim 10, wherein said step for calculating said compressed term values according to said operation further comprises the steps of:
defining a correlation between a set of values and each of said term characters in said set of terms;
equating said term characters in each of said terms with said values according to said defined correlation;
calculating a summation for each of said terms, wherein said summation includes each of said values correlated to each of said term characters;
reducing said term characters used in calculating said summation for a non-uniquely compressed term, wherein said non-uniquely compressed term is any term having a character length and compressed term value equal to another term having an identical character length and an identical compressed term value; and
repeating said calculating step and reducing step for said non-uniquely compressed term.

12. A process according to claim 11, wherein said step for calculating said compressed term values according to said operation further comprises the step of truncating said summation to a plurality of least significant bits for each of said terms.

13. A process according to claim 10, further comprising the steps of:
defining a maximum character length for said operation, wherein said maximum character length corresponds with a maximum hierarchy of said trap elements; and
limiting said step for calculating said term values to said maximum character length for each of said terms having character lengths greater than said maximum character length.

14. A process according to claim 13, further comprising the steps of:
selecting said operation from the group consisting of summation, subtraction, multiplication, division, XOR, XNOR, and concatenation;
truncating said compressed term values to a plurality of least significant bits for each of said terms;
storing at least one term character from each of said terms in said set of terms in a comparison character matrix, said comparison character matrix having rows and columns defined according to said hierarchy of said trap elements and according to said truncated compressed term values;
sequencing at least one data character through each of said trap matrix elements without any compression of said data character;
comparing said data character with said term character from said set of terms for a character match therebetween when any combined character set matches said corresponding pattern of said character combinations; and
proceeding to said step for determining said exact match when said character match occurs.

15. A process according to claim 14, further comprising the steps of:
identifying each of said compressed term values in said set of compressed term values with a set of active control bits; and
storing each of said active control bits in an active control matrix, said active control matrix having rows and columns defined according to said hierarchy of said trap elements and according to said truncated compressed term values.

16. A process according to claim 15, further comprising the steps of:
identifying a case-sensitive set of said terms according to a case-sensitive matrix;
defining said pattern of said set of terms independent of any case-sensitivity; and
setting each of said characters in said data stream to a single case at said input.

17. A process according to claim 13, further comprising the step of defining a set of security rules for a computer network as said set of terms.

18. A process according to claim 17, further comprising the steps of:
- receiving a data packet in the data stream at said input during said time period, said data packet comprising a header and a body, said header including a set of protocol parameters and said body including said set of data characters;
- checking said protocol parameters and said data characters with said set of security rules to detect an attempt to breach security through said computer network.

19. A process according to claim 18, further comprising the steps of:
- searching a plurality of incoming data packets coming into said computer network for said attempt to breach security; and
- searching a plurality of outgoing data packets going out of said computer network for said attempt to breach security.

20. A process for electronically searching a data stream, comprising the steps of:
- (a) storing a set of terms in a term table according to a set of table addresses, wherein each of said terms stored in said term table has a plurality of term characters, wherein said set of terms has a plurality of character lengths;
- (b) compressing said set of terms into a set of compressed term values according to a compression operation on said term characters for each of said terms;
- (c) correlating said stored set of terms with said set of table addresses according to a set of one-to-one pointers, said set of one-to-one pointers comprising a pointer matrix, said pointer matrix having row and column coordinates according to said character lengths and according to said compressed term values;
- (d) receiving the data stream at an input during a time period, the data stream comprising a set of data characters having a plurality of data character lengths, and said time period comprising a plurality of clock cycles;
- (e) sequencing said received data stream through a trap matrix during said time period, said trap matrix comprising a set of trap elements and a set of delay elements, wherein said set of trap elements have a hierarchy according to said set of delay elements, said hierarchy of said trap elements having a one-to-one correspondence with said character lengths of said set of terms, and wherein said sequencing step comprises the steps of:
  - (i) reading in parallel a current character from said input for each of said trap elements,
  - (ii) compressing in parallel said set of data characters into a set of data values according to said compression operation, wherein said compression operation is simultaneously performed in each of said trap elements, and
  - (iii) shifting said set of compressed data values through said set of delay elements according to said hierarchy of said delay elements;
- (f) simultaneously checking for a value match between a compressed data value in said set of compressed data values and a compressed term value in said set of compressed term values for each of said trap elements and for each of said character lengths, respectively, wherein said set of compressed data values are respectively checked with said set of compressed term values according to said one-to-one correspondence between said hierarchy of said trap elements and said character lengths of said set of terms, wherein a pattern match returns a matching compressed data value from said set of compressed data values and a matching hierarchy from said hierarchy of said trap elements; and
- (g) checking for an exact match between a portion of said received data stream and an exact term from said set of terms when said value match occurs, wherein said exact term is stored at a table address according to a unique one-to-one pointer from said pointer matrix, said unique one-to-one pointer having a row and column coordinate equal to said matching compressed data value and said matching hierarchy.

21. A process according to claim 20, wherein said compression operation further comprises the step of calculating a summation.

22. A process according to claim 21, further comprising the step of truncating said summation to a plurality of least significant bits for each of said terms.

23. A process according to claim 20, further comprising the steps of:
- identifying a case-sensitive set of said terms according to a case-sensitive matrix;
- defining said compression operation independent of any case-sensitivity;
- defining a maximum character length for said compression operation, wherein said maximum character length corresponds with a maximum hierarchy of said trap elements;
- limiting said step for compressing said set of terms to said maximum character length for each of said terms having character lengths greater than said maximum character length; and
- setting each of said characters in said data stream to a single case at said input.

24. A process according to claim 23, further comprising the steps of:
- selecting said compression operation from the group consisting of summation, subtraction, multiplication, division, XOR, XNOR, and concatenation;
- truncating said compressed term values to a plurality of least significant bits for each of said terms;
- storing at least one term character from each of said terms in said set of terms in a comparison character matrix, said comparison character matrix having rows and columns defined according to said hierarchy of said trap elements and according to said truncated compressed term values;
- sequencing at least one data character through each of said trap matrix elements without any compression of said data character;
- checking for a character match between said data character and said term character from said set of terms when said value match occurs; and
- proceeding to said step for checking for said exact match when said character match occurs.

25. A process according to claim 24, further comprising the steps of:
- identifying each of said compressed term values in said set of compressed term values with a set of active control bits; and
- storing each of said active control bits in an active control matrix, said active control matrix having rows and columns defined according to said hierarchy of said trap elements and according to said truncated compressed term values.

26. A process according to claim 20, further comprising the step of defining a set of security rules as said set of terms.

27. A process for electronically detecting an attempt to breach security of a computer network, comprising the steps of:
(a) defining a set of security rules, said security rules comprising a plurality of characters in a plurality of character lengths and a plurality of character combinations;
(b) storing said set of security rules in a rule table according to a set of table addresses;
(c) correlating said stored set of security rules with said set of table addresses according to a set of one-to-one pointers, said set of one-to-one pointers comprising a pointer matrix, said pointer matrix having rows and columns according to said character lengths of said set of security rules and according to a set of patterns corresponding with said set of security rules, wherein said set of patterns uniquely corresponds with said set of security rules according to said character combinations in said character lengths for each of said security rules;
(d) receiving a data packet at an input during a time period, said data packet comprising a set of characters having a length and said time period comprising a plurality of clock cycles,
(e) sequencing said received data packet through a trap matrix during said time period, said trap matrix comprising a set of trap elements and a set of delay elements, wherein said trap elements are in multiplexed communication with said input and wherein said trap elements have a hierarchy according to said set of delay elements, wherein an increasing series of said delay elements between each of said trap elements and said input results in an increasing order in said hierarchy of said trap elements, said sequenced data packet having a set of lengths according to said hierarchy of said trap elements and said hierarchy of said trap elements having a one-to-one correspondence with said character lengths of said set of security rules, and wherein said sequencing step further comprises the steps of:
  (i) reading in parallel a current character from said input for each of said trap elements,
  (ii) combining in parallel said current character with a set of previously combined set of characters according to said hierarchy of said trap elements to produce a combined character set, and
  (iii) shifting said combined character set through said set of delay elements and said set of trap elements according to said hierarchy;
(f) simultaneously checking for a pattern match between said combined character set from said received data packet and said set of patterns uniquely corresponding with said set of security rules for each of said trap elements and for each of said character lengths, respectively, wherein said combined character set is respectively checked with said set of patterns according to said one-to-one correspondence between said hierarchy of said trap elements and said character lengths of said set of terms, wherein a pattern match returns a matching combined character set of said combined character set and a matching hierarchy of said trap elements; and
(g) checking for an exact match between a portion of said data packet and an exact security rule from said set of security rules when said pattern match occurs, wherein said exact security rule is stored in said rule table at a table address according to a unique one-to-one pointer from said pointer matrix, said unique one-to-one pointer having a row and a column equal to said matching combined character set and said matching hierarchy.

28. A system for searching a data stream, comprising:
a rule table having a set of terms and a set of table addresses, wherein each of said terms in said set of terms is stored in said rule table at a location defined by a table address in said set of table addresses; wherein said set of terms comprise a plurality of term characters having a plurality of character lengths and a plurality of character combinations associated with said character lengths, and wherein said set of terms includes at least one term having a character length and a character combination;

a set of one-to-one pointers comprising a pointer matrix, said set of one-to-one pointers correlating said table addresses with said set of terms in said rule table, said pointer matrix further comprising row and column coordinates defined according to said character lengths and according to a set of patterns corresponding with said set of terms, wherein said set of patterns uniquely corresponds with said character combinations for any of said terms having equal character lengths, and wherein said set of patterns includes at least one pattern corresponding with said at least one term;

a buffer memory;

an input for receiving the data stream during a time period, the data stream comprising a set of data characters having a data length and a data combination and said time period comprising a plurality of clock cycles, said input further comprising a bypass for communicating the data stream through said buffer memory, a trap matrix comprising a set of trap elements and a set of delay elements, said trap matrix sequencing said set of said data characters in the data stream from said input through each of said trap elements, wherein said trap elements are in multiplexed communication with said input and wherein said trap elements have a hierarchy according to said set of delay elements, said hierarchy of said trap elements having a one-to-one correspondence with said character lengths of said set of terms, wherein said set of trap elements further comprise a set of memory-comparator pairs according to said hierarchy of said trap elements, said set of data characters entering said memory-comparator pairs as a set of set of sequenced data, wherein said set of memory-comparator pairs checks for a pattern match between said set of sequenced data and said set of patterns, wherein each of said memory-comparator pairs simultaneously checks for said pattern match according to said one-to-one correspondence between said hierarchy of said trap elements and said character lengths of said set of terms, wherein a matching memory-comparator pair defines a row and column coordinate according to said hierarchy of said trap elements and said sequenced data;

an exact match lookup in communication with said buffer, said trap matrix and said rule table, said exact match lookup receiving a portion of the data stream from the buffer and receiving said row and column coordinate from said trap matrix, said row and column coordinate comprising a hierarchy and sequenced data according to said matching memory-comparator pair; said exact match lookup retrieving an exact term from said rule table according to a table address in said pointer matrix, said table address being defined by a unique one-to-one pointer having said row and column coordinate; said exact match lookup checking for an exact match between said exact term and said portion of the data stream.

29. A system according to claim 28, wherein said trap matrix further comprises an increasing series of said delay elements between each of said trap elements and said input, said increasing series of said delay elements defining an increasing order in said hierarchy of said trap elements, wherein said increasing order of said hierarchy corresponds with an increasing character length of the data stream.

30. A system according to claim 28, wherein each of said trap elements further comprises a compression operator located between said input and each of said memory-comparator pairs.

31. A system according to claim 30, wherein said compression operator is selected from the group of operators consisting of summation, subtraction, multiplication, division, XOR, XNOR, and concatenation.

32. A system according to claim 30, wherein each of said trap elements further comprises a truncation element located between said compression operator and each of said memory-comparator pairs.

33. A system according to claim 28, wherein each of said trap elements further comprise a summation operator located between said input and each of said memory-comparator pairs.

34. A system according to claim 33, wherein each of said trap elements further comprises a truncation element located between said summation operator and each of said memory-comparator pairs.

35. A system according to claim 28, wherein said trap elements have a maximum hierarchy corresponding with a maximum character length for said set of terms in said rule table.

36. A system according to claim 28, wherein said set of terms further comprise a set of security rules.

37. A system according to claim 28, wherein said trap matrix is a content addressable memory and said memory-comparator pairs contain said set of one-to-one pointers.

38. A system according to claim 28, wherein said trap matrix is a standard memory and said memory-comparator pairs are comprised of a memory in communication with a comparator.

39. A system according to claim 28, further comprising an additional trap matrix, said additional trap matrix comprising an additional set of trap elements and an additional set of delay elements, said additional trap matrix being in communication with said input and said trap matrix.

* * * * *